(12) United States Patent
Rinker et al.

(10) Patent No.: US 10,267,590 B1
(45) Date of Patent: Apr. 23, 2019

(54) SPIRAL-WOUND SPLIT-BUSS LET-OUT MECHANISM FOR A COMPOUND ARCHERY BOW

(71) Applicant: BowTech, Inc., Eugene, OR (US)

(72) Inventors: Dylan G. Rinker, Eugene, OR (US); Nicholas C. Obteshka, Springfield, OR (US); Tony E. Hyde, Deary, ID (US); Allen C. Rasor, Jr., Marana, AZ (US)

(73) Assignee: BOWTECH, INC., Eugene, OR (US)

( * ) Notice: Subject to any disclaimer, the term of this patent is extended or adjusted under 35 U.S.C. 154(b) by 0 days.

(21) Appl. No.: 16/021,047

(22) Filed: Jun. 28, 2018

(51) Int. Cl.
*F41B 5/10* (2006.01)
*F16H 55/36* (2006.01)

(52) U.S. Cl.
CPC ........ *F41B 5/105* (2013.01); *F16H 2055/363* (2013.01)

(58) Field of Classification Search
CPC .................................. F41B 5/10; F41B 5/105
See application file for complete search history.

(56) References Cited

U.S. PATENT DOCUMENTS

| | | | |
|---|---|---|---|
| 3,990,425 A | 11/1976 | Ketchum | |
| 4,300,521 A | 11/1981 | Schmitt | |
| 4,338,910 A * | 7/1982 | Darlington | F41B 5/10 124/25.6 |
| 4,340,025 A * | 7/1982 | Caldwell | F41B 5/105 124/23.1 |
| 4,440,142 A | 4/1984 | Simonds | |
| 4,546,754 A | 10/1985 | Smith | |
| 4,686,955 A | 8/1987 | Larson | |
| 4,733,648 A | 3/1988 | Martin | |
| 4,781,167 A | 11/1988 | Martin | |
| 4,909,231 A | 3/1990 | Larson | |
| 5,368,006 A | 11/1994 | McPherson | |
| 5,381,777 A | 1/1995 | Mitchell et al. | |
| 5,390,655 A | 2/1995 | Mitchell et al. | |
| 5,623,915 A | 4/1997 | Kudlacek | |
| 5,687,703 A | 11/1997 | Vyprachticky | |
| 5,697,355 A | 12/1997 | Schaffer | |
| 5,890,480 A | 4/1999 | McPherson | |

(Continued)

OTHER PUBLICATIONS

Krenz, Bill: "Mathews McPherson Series Monster"; Inside Archery (Jun. 2009; p. 30); http://mathewsinc.com/data/mathewsinc/file/245_45289_Mathews%20Monster_2.pdf.

(Continued)

*Primary Examiner* — John A Ricci
(74) *Attorney, Agent, or Firm* — David S. Alavi

(57) ABSTRACT

A pulley assembly for a compound archery bow comprises an axle, a draw cable pulley, and a pair of split-buss let-out pulleys positioned on opposite sides of the draw cable pulley. Each secondary cable of a split-buss end of a power cable is wound in a spiral arrangement around a corresponding split-buss let-out pulley. As the bow is drawn, the pulley assembly rotates, the draw cable pulley lets out a draw cable, and each split-buss let-out pulley lets out the corresponding secondary cable. The spiral arrangement results in lateral movement, away from the draw cable pulley, of a contact point of the corresponding secondary power cable on each split-buss let-out pulley as the bow is drawn. The spiral arrangement can include a corresponding spiral groove on each split-buss let-out pulley.

25 Claims, 12 Drawing Sheets

(56) References Cited

U.S. PATENT DOCUMENTS

| | | | |
|---|---|---|---|
| 6,237,582 B1 | 5/2001 | McPherson | |
| 6,474,324 B1 | 11/2002 | Despart et al. | |
| 6,659,096 B1 | 12/2003 | Nealy et al. | |
| 6,792,930 B1 | 9/2004 | Kronengold et al. | |
| 6,871,643 B2 | 3/2005 | Cooper et al. | |
| 6,990,970 B1 | 1/2006 | Darlington | |
| 7,188,615 B2 | 3/2007 | Chang | |
| 7,305,979 B1 | 12/2007 | Yehle | |
| 7,441,555 B1 | 10/2008 | Larson | |
| 7,441,755 B2 | 10/2008 | Larson | |
| 8,037,876 B1 | 10/2011 | Yehle | |
| 8,181,638 B1 | 5/2012 | Yehle | |
| 2010/0206284 A1* | 8/2010 | Popov | F41B 5/10 124/88 |
| 2017/0370673 A1* | 12/2017 | Yehle | F41B 5/10 |

OTHER PUBLICATIONS

Silks, Jon E.; "Mathews McPherson Series Monster"; Bowhunting (Aug. 2009; p. 18); http://mathewsinc.com/data/mathewsinc/file/245_45293_BOWP-090800-HGM.pdf.

Bell, Joe; "Mathews McPherson Series Monster"; Bow & Arrow Hunting (believed published in 2009); http://mathewsinc.com/data/mathewsinc/file/245_44981_BOW_4.pdf.

Hartle, Luke L.; ". . . And Then There Were Two"; North American Hunter (believed published in 2009); http://mathewsinc.com/data/mathewsinc/file/245_44305_NorAmerHunterMathews2009NewProducts.pdf.

Murray, Jeff; Mathews is Unbearish for 2009; Bear Hunting Magazine (Jan./Feb. 2009); http://mathewsinc.com/data/mathewsinc/file/245_44237_Mathews-Murray.pdf.

Mathews; Inc.; magazine ad copy (believed published in 2009); http://mathewsinc.com/data/mathewsinc/file/245_44993_monster_full-boww-lrz.pdf.

* cited by examiner

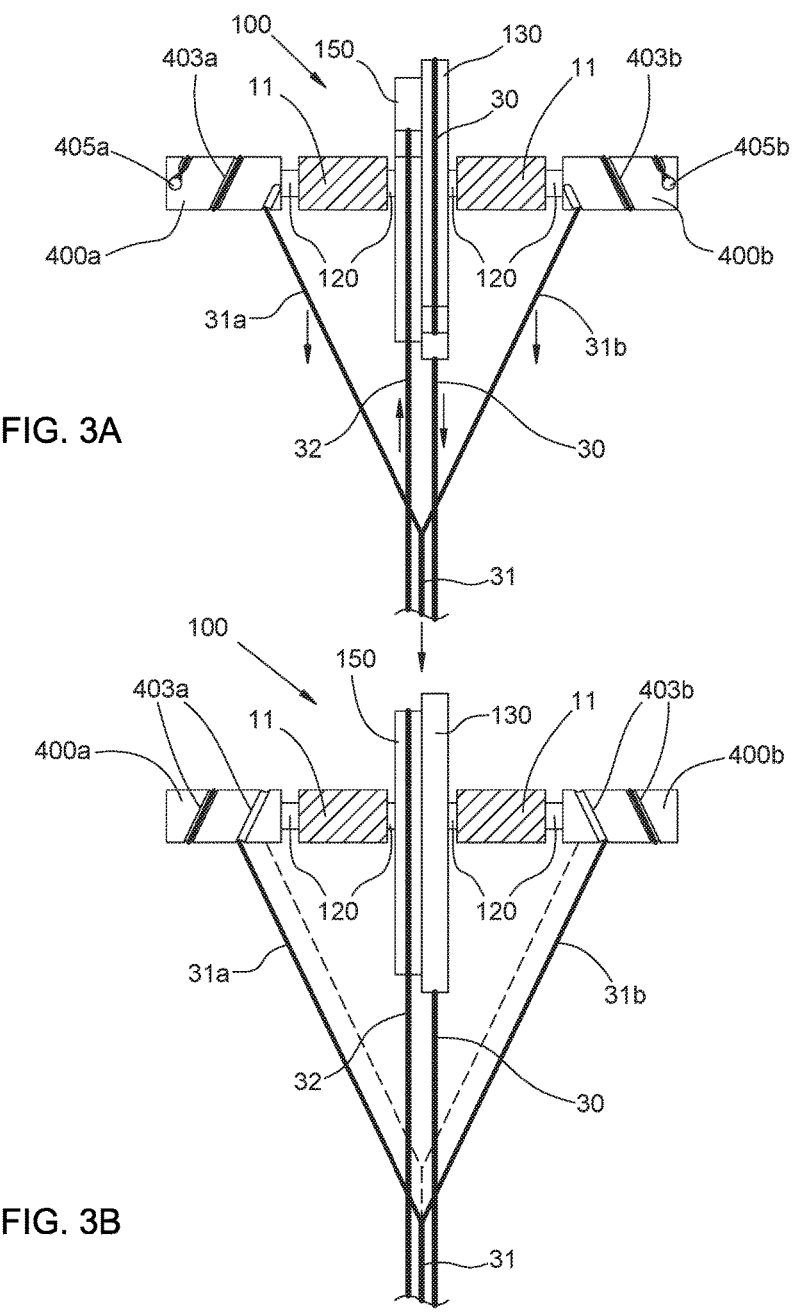

SPIRAL-WOUND SPLIT-BUSS LET-OUT MECHANISM FOR A COMPOUND ARCHERY BOW

FIELD OF THE INVENTION

The field of the present invention relates to archery bows. In particular, a compound archery bow is described herein wherein a power cable is simultaneously taken up at one end and let out at the other end using a spiral-wound split-buss let-out mechanism.

BACKGROUND

For purposes of the present disclosure and appended claims, the terms "compound archery bow" or "compound bow" shall denote an archery bow that uses a levering system, usually comprising one or more cables and pulleys, to bend the limbs as the bow is drawn. Examples of compound bows include both (i) so-called vertical compound bows, wherein a user holds the riser (oriented roughly vertically) with one hand and draws the bow with the other hand, and (ii) crossbows, wherein the riser is mounted (oriented roughly horizontally) on a stock/rail assembly and the user holds and aims the crossbow like a rifle. Examples of compound bows include dual cam bows, binary cam bows (including those that employ a Binary Cam System®), hybrid cam bows, and solo cam bows (also referred to as single cam bows). Such compound archery bows typically include one or more power cables (sometimes referred to as buss cables or anchor cables). Conventionally, each power cable is engaged at a first end (i.e., referred to as its take-up end) to be taken up by a power cable pulley (or other take-up mechanism) of a pulley assembly rotatably mounted on one bow limb, and is connected at its other end to the other bow limb. Tension developed as the bow is drawn and the power cable is taken up causes deformation of the bow limbs and storage of potential energy therein. A portion of that potential energy is transformed into the kinetic energy of the arrow shot by the bow. Some examples of different compound bow types are disclosed in the various patents listed below, all of which are incorporated by reference as if fully set forth herein. In some examples of compound bows (i.e., all dual cam bows, some solo cam bows, and some hybrid cam bows), the power cable is connected at its second end directly to the other bow limb or to an axle on which an idler wheel or pulley assembly is rotatably mounted on the other bow limb. In such examples the second end of the power cable is neither taken up nor let out when the bow is drawn. In some other examples of compound bows (i.e., all binary cam bows, some solo cam bows, and some hybrid cam bows), the power cable is connected at its second end indirectly to the other bow limb, and is let out by a let-out pulley (or other let-out mechanism) of a pulley assembly rotatably mounted on the other bow limb during at least a portion of drawing of the bow.

Any of those arrangements (direct connection, or indirect connection with let-out), can include a split-buss power cable arrangement, in which a pair of secondary power cables connects the second end of the power cable (i.e., the end not taken up) to the other bow limb. In some examples of a split-buss arrangement, the power cable is bifurcated at its second end to form the two secondary power cables in a split-cable arrangement (e.g., as in FIG. 8A); in some other examples, the second end of the power cable forms one of the secondary power cables, and an additional, discrete cable segment is attached to the power cable, at a point displaced from its end, to form the other secondary power cable (e.g., as in FIG. 8B); in some other examples, the power cable and two separate secondary power cables are each connected to a yoke or coupling member (e.g., as in FIG. 8C); in some examples, the power cable is connected to the yoke or coupling member, and a single cable segment is looped around the yoke or coupling member to form both of the two secondary power cables (e.g., as in FIG. 8D). Any of those split-buss cable arrangements can include attachment of the secondary power cables on opposite sides of a pulley assembly between a draw cable pulley and the limb, or on opposite sides of both the limb and the draw cable pulley. If secured between the draw cable pulley and the limb, the spacing provided by a yoke or coupling member can enable rotation of the pulley member without interference from the secondary power cables. If no yoke or coupling member is employed, the secondary power cables are often secured on opposite sides of the limb to enable rotation of the pulley assembly without interference from the secondary power cables, but in some instances they can be secured between the draw cable pulley and the limb. Examples of different split-buss arrangements of various compound bows are disclosed in some of the patents listed below, all of which are incorporated by reference as if fully set forth herein.

The patents referred to above are that are incorporated by reference as if fully set forth herein are:

U.S. Pat. No. 3,990,425 entitled "Compound bow" issued Nov. 9, 1976 to Ketchum;

U.S. Pat. No. 4,300,521 entitled "Compound bow" issued Nov. 17, 1981 to Schmitt;

U.S. Pat. No. 4,440,142 entitled "Compound bow cable tension adjuster" issued Apr. 3, 1984 to Simonds;

U.S. Pat. No. 4,546,754 entitled "Yoke anchor for a compound bow" issued Oct. 15, 1985 to Smith;

U.S. Pat. No. 4,686,955 entitled "Compound archery bows" issued Aug. 18, 1987 to Larson;

U.S. Pat. No. 4,733,648 entitled "Compound bow cable anchor" issued Mar. 29, 1988 to Martin;

U.S. Pat. No. 4,781,167 entitled "Compound bow with adjustable tension cable anchor" issued Nov. 1, 1988 to Martin;

U.S. Pat. No. 4,909,231 entitled "Dual anchor cable separator for compound bows" issued Mar. 20, 1990 to Larson;

U.S. Pat. No. 5,368,006 entitled "Dual-feed single-cam compound bow" issued Nov. 29, 1994 to McPherson;

U.S. Pat. No. 5,381,777 entitled "Compound bow and yoke adjuster" issued Jan. 17, 1995 to Mitchell et al;

U.S. Pat. No. 5,390,655 entitled "Compound bow and cable mounting bracket" issued Feb. 21, 1995 to Mitchell et al;

U.S. Pat. No. 5,623,915 entitled "Archery bowstring system" issued Apr. 29, 1997 to Kudlacek;

U.S. Pat. No. 5,890,480 entitled "Dual-feed single-cam compound bow" issued Apr. 6, 1999 to McPherson;

U.S. Pat. No. 6,237,582 entitled "Archery bow with bow string coplanar with the longitudinal axis of the bow handle" issued May 29, 2001 to McPherson;

U.S. Pat. No. 6,474,324 entitled "Archery bows, archery bow cam assemblies, and archery bow anchors" issued Nov. 5, 2002 to Despart et al;

U.S. Pat. No. 6,659,096 entitled "Split-buss-cable single-cam compound archery bow" issued Dec. 9, 2003 to Nealy et al;

U.S. Pat. No. 6,792,930 entitled "Single-cam split-harness compound bow" issued Sep. 21, 2004 to Kronengold et al;

U.S. Pat. No. 6,871,643 entitled "Eccentric elements for a compound archery bow" issued Mar. 29, 2005 to Cooper et al;

U.S. Pat. No. 6,990,970 entitled "Compound archery bow" issued Jan. 31, 2006 to Darlington;

U.S. Pat. No. 7,305,979 entitled "Dual-cam archery bow with simultaneous power cable take-up and let-out" issued Dec. 11, 2007 to Yehle;

U.S. Pat. No. 7,441,555 entitled "Synchronized compound archery bow" issued Oct. 28, 2008 to Larson;

U.S. Pat. No. 7,770,568 entitled "Dual-cam archery bow with simultaneous power cable take-up and let-out" issued Aug. 10, 2010 to Yehle;

U.S. Pat. No. 8,082,910 entitled "Pulley assembly for a compound archery bow" issued Dec. 27, 2011 to Yehle;

U.S. Pat. No. 8,037,876 entitled "Pulley-and-cable power cable tensioning mechanism for a compound archery bow" issued Oct. 18, 2011 to Yehle;

U.S. Pat. No. 8,181,638 entitled "Eccentric power cable let-out mechanism for a compound archery bow" issued May 22, 2012 to Yehle;

U.S. Pat. No. 8,469,013 entitled "Cable take-up or let-out mechanism for a compound archery bow" issued Jun. 25, 2013 to Obteshka et al;

U.S. Pat. No. 8,739,769 entitled "Cable take-up or let-out mechanism for a compound archery bow" issued Jun. 3, 2014 to Obteshka et al;

U.S. Pat. No. 9,347,730 entitled "Adjustable pulley assembly for a compound archery bow" issued May 24, 2016 to Obteshka;

U.S. Pat. No. 9,417,028 entitled "Adjustable pulley assembly for a compound archery bow" issued Aug. 16, 2016 to Hyde et al;

U.S. Pat. No. 9,441,907 entitled "Adjustable pulley assembly for a compound archery bow" issued Sep. 13, 2016 to Obteshka;

U.S. Pat. No. 9,506,714 entitled "Adjustable pulley assembly for a compound archery bow" issued Nov. 29, 2016 to Eacker et al;

U.S. Pat. No. 9,739,562 entitled "Adjustable pulley assembly for a compound archery bow" issued Aug. 22, 2017 to Obteshka; and U.S. non-provisional application Ser. No. 15/940,946 entitled "Adjustable pulley assembly for a compound archery bow" filed Mar. 29, 2018 in the names of Rinker et al.

SUMMARY

An inventive pulley assembly for a compound archery bow comprises an axle, a draw cable pulley, and a pair of split-buss let-out pulleys positioned on opposite sides of the draw cable pulley. The axle is structurally arranged so as to (i) define a first pulley assembly transverse rotation axis and (ii) be rotatably mounted on a first limb of a compound archery bow to rotate about the first pulley assembly axis. The draw cable pulley is (i) non-rotatably mounted on the axle and (ii) structurally arranged so as to let out, from a circumferential draw cable groove thereof, a draw cable of the archery bow, when the bow is drawn and the draw cable pulley rotates with the axle about the first pulley assembly axis. Each split-buss let-out pulley is (i) non-rotatably mounted on the axle, and (ii) structurally arranged so as to let out a corresponding one of two secondary power cables of a split-buss end of a first power cable of the archery bow, when the bow is drawn and the pair of split-buss let-out pulleys rotates with the axle about the first pulley assembly axis. Each split-buss let-out pulley is arranged to have wound therearound the corresponding secondary power cable in a spiral arrangement so that, when the bow is drawn, as the pulley assembly rotates and the corresponding secondary power cable is let-out from the split-buss let-out pulley, a contact point of the corresponding secondary power cable on the split-buss let-out pulley moves laterally away from the draw cable pulley.

In some examples, each split-buss let-out pulley can include a spiral groove arranged to receive therein the corresponding secondary power cable wound in the spiral arrangement; each secondary power cable is let out from the corresponding groove as the bow is drawn. Pitch, pitch angle, secondary cable angle, and effective radius of the spiral arrangements (and spiral grooves, if present) can be substantially equal for both split-buss let-out pulleys, or one or more of those parameters can differ between the two split-buss let-out pulleys. Pitch, pitch angle, secondary cable angle, and effective radius of the spiral arrangements (and spiral grooves, if present) can vary with rotation of the pulley assembly (along the corresponding groove, if present), or can remain substantially constant. In some examples, the inventive pulley assembly can further include a power cable take-up mechanism; two such inventive pulley assemblies can be incorporated into a binary cam bow. In some examples, the draw cable pulley of the inventive pulley assembly can comprise an idler wheel; such an inventive pulley assembly can be incorporated into a solo cam bow. In some examples, the inventive pulley assembly can further include a coupling cable take-up mechanism; such an inventive pulley assembly can be incorporated into a hybrid cam bow.

In some examples, the pulley assembly includes only a single split-buss let-out pulley, and the secondary power cables are corresponding portions of a single cable segment that loops around a yoke or coupler attached to the power cable. One end of the cable segment is fixed to the bow limb or axle (neither taken up nor let out), while the other end is wound around the single split-buss let-out pulley in a spiral arrangement to be let-out as the bow is drawn. The yoke or coupler moves along the cable segment as the bow is drawn.

Objects and advantages pertaining to split-buss compound archery bows may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 3A and 3B are schematic front views of the example inventive pulley assembly of FIGS. 2A and 2B, with the binary cam bow at brace and drawn, respectively.

Figure 1:
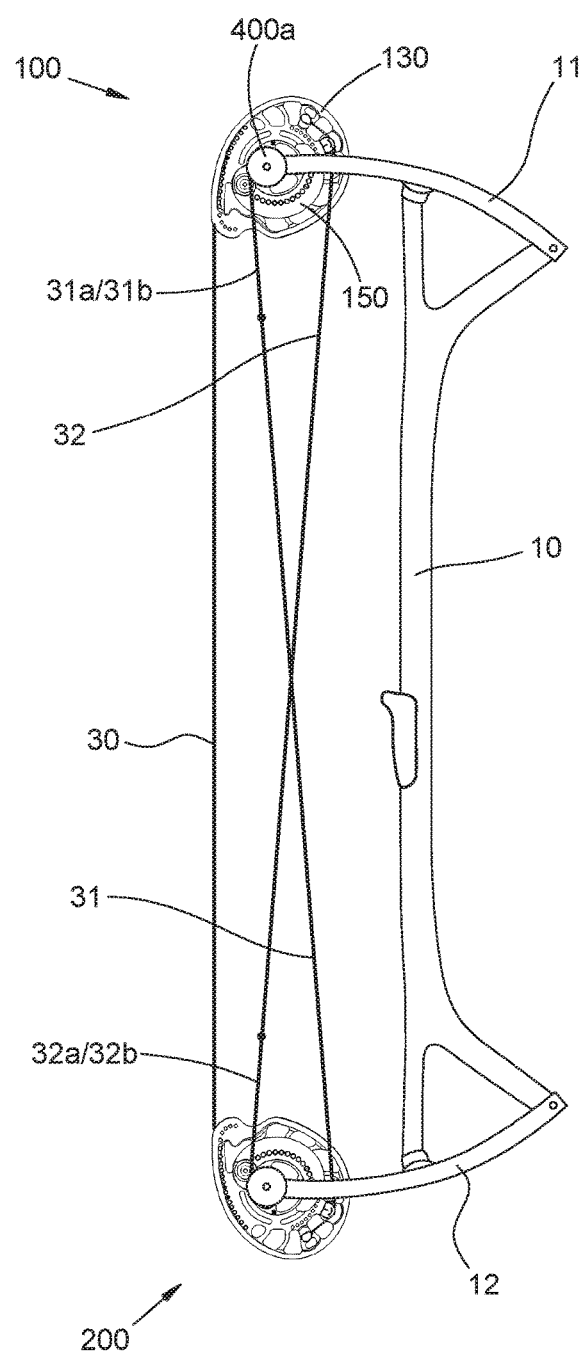
FIG. 1 illustrates schematically an example binary cam compound archery bow incorporating two example inventive pulley assemblies.

The embodiments depicted are shown only schematically; all features may not be shown in full detail or in proper proportion, certain features or structures may be exaggerated relative to others for clarity, and the drawings should not be regarded as being to scale. The embodiments shown are only examples, and should not be construed as limiting the scope of the present disclosure or appended claims.

DETAILED DESCRIPTION OF EMBODIMENTS

Inventive pulleys assemblies disclosed or claimed herein are suitable for use in compound bows that employ a split-buss arrangement for the power cable(s) and are also arranged to let-out the split-buss end(s) of the power cable(s) during at least a portion of drawing of the bow. Accordingly, the disclosed inventive pulley assemblies can be employed in a binary cam bow with a split-buss arrangement of the power cables (e.g., as in FIGS. 1, 2A, 2B, 3A, 3B, 9A, 9B, 10A, 10B, 11A, 11B, 12A, and 12B), in a solo cam bow with a split-buss arrangement of the power cable and let-out of the split-buss end of the power cable (e.g., as in FIGS. 4, 5A, and 5B), or in a hybrid cam bow with a split-buss arrangement of the power cable and let-out of the split-buss end of the power cable (e.g., as in FIGS. 6, 7A, and 7B). The examples shown in the drawings are all vertical compound bows; however, inventive pulley assemblies disclosed or claimed herein can be incorporated into a crossbow or into a vertical compound bow.

A compound archery bow comprises a central riser 10, first and second bow limbs 11 and 12 secured to opposing ends of the riser 10, first and second pulley assemblies 100 and 200 rotatably mounted on the first and second bow limbs 11 and 12, respectively, a draw cable 30, and a power cable 31. Each limb 11/12 can comprise a single limb member with a bifurcated end portion arranged to accommodate the corresponding pulley assembly, or can comprise paired split-limb members with the corresponding pulley assembly positioned between them.

If the bow is a binary cam bow (e.g., as in FIG. 1), then the bow includes a second power cable 32. In such examples the first and second pulley assemblies 100 and 200 are both inventive pulley assemblies as described further hereinbelow, and typically are substantially identical or substantial mirror images of each other. Upon drawing a binary cam bow, the draw cable 30 is let out by both pulley assemblies 100 and 200, the split-buss end of the power cable 31 is let out (via let-out of secondary power cables 31a/31b) by the first pulley assembly 100 while its other end is taken up by the second pulley assembly 200, and the split-buss end of the second power cable 32 is let out (via let-out of secondary power cables 32a/32b) by the second pulley assembly 200 while its other end is taken up by the first pulley assembly 100.

If the bow is a solo cam bow (e.g., as in FIG. 4), then the inventive first pulley assembly 100 includes an idler wheel as the draw cable pulley 130, and the draw cable 30 passes around the idler wheel and is connected at both of its ends to the second pulley assembly 200. Upon drawing a solo cam bow, both ends of the draw cable are let out by the second pulley assembly 200, one end from a draw cable pulley 230 and the other end from a let-out mechanism (e.g., from the let-out pulley 280); the split-buss end of the power cable 31 is let out (via let-out of the secondary power cables 31a/31b) by the inventive first pulley assembly 100 while its take-up end is taken up by a power cable take-up mechanism of the second pulley assembly 200 (e.g., by the power cable pulley 250).

If the bow is a hybrid cam bow (e.g., as in FIG. 6), then the bow includes an additional coupling cable 33 connected to the first and second pulley assemblies 100 and 200, and the inventive first pulley assembly 100 includes a draw cable pulley 130 and a coupling cable take-up mechanism (e.g., the take-up pulley 190). Upon drawing a hybrid cam bow, the draw cable 30 is let out by both pulley assemblies 100 and 200 from draw cable pulleys 130 and 230, respectively; the coupling cable 33 is taken up by the coupling cable take-up mechanism of the first pulley assembly 100 (e.g., by the take-up pulley 190), and let out from the coupling cable let-out mechanism of the second pulley assembly 200 (e.g., from the let-out pulley 290); the split-buss end of the power cable 31 is let out (via let-out of the secondary power cables 31a/31b) by the inventive first pulley assembly 100 while its take-up end is taken up by a power cable take-up mechanism of the second pulley assembly 200 (e.g., by the power cable pulley 250).

An inventive pulley assembly 100 for a compound archery bow comprises an axle 120, a draw cable pulley 130, and a pair of split-buss let-out pulleys 400a/400b positioned on opposite sides of the draw cable pulley 130. Each of those elements (and other elements described herein, e.g., a power cable pulley, or elements of the second pulley assembly 200) can be fabricated in any suitable way from any one or more suitably strong and rigid materials; such elements are commonly fabricated by casting or machining from aluminum; other materials or fabrication methods can be employed.

The axle 120 defines a first pulley assembly transverse rotation axis, and is rotatably mounted on the first limb 11 of the archery bow to rotate about the first pulley assembly axis. "Transverse" in the context of the present disclosure refers to a direction that is substantially perpendicular to a virtual plane in which the draw cable 30 moves as the bow is drawn (often referred to as the shooting plane); the first pulley assembly axis is substantially perpendicular to that virtual plane. Similarly, the second pulley assembly 200 (whatever its type) is mounted on the second bow limb 200 to rotate about a corresponding second pulley assembly transverse rotation axis. Any suitable mounting arrangements can be employed, e.g., the axle 120 passing through rotational bearings that in turn pass through or are mounted on the bow limb 11; various examples are disclosed by some of the references incorporated above. The draw cable pulley 130 is non-rotatably mounted on the axle 120 in any suitable way, e.g., by integral formation of the axle 120 and the draw cable pulley 130, or by mechanical indexing of the axle 120 and the draw cable pulley 130 (e.g., by mating splines or grooves, by one or more pins or screws, one or more mating flanges, or other suitable structural arrangement). "Non-rotatable" in the context of the present disclosure means that no relative rotation occurs, or that any relative rotation that might occur has only a negligible effect, or no effect, on the operation of the bow. The draw cable pulley 130 includes a circumferential draw cable journal or groove arranged around at least a portion of its periphery; the draw cable 30 can be secured to the draw cable pulley 130 in any suitable way. When the bow is drawn, the draw cable 30 is let out from the circumferential groove as the draw cable pulley 130 rotates with the axle 120 about the first pulley assembly axis. The draw cable pulley 130 can be eccentrically mounted (relative to the axle 120) or non-circular so as to act as a cam as it lets out the draw cable 30.

Each split-buss let-out pulley 400a/400b is non-rotatably mounted on the axle 120 on opposite sides of the draw cable pulley 130. In many examples (including, e.g., those of FIGS. 2A/2B, 3A/3B, 5A/5B, 7A/7B, 9A/9B, and 10A/10B), the split-buss let-out pulleys 400a/400b include corresponding spiral grooves 403a/403/b; in some examples (including, e.g., that of FIGS. 11A/11B), the split-buss let-out pulleys 400a/400b do not have any grooves. Typically, the split-buss let-out pulleys 400a/400b can be positioned on the axle 120 with the bow limb 11 between them as well. When the bow is drawn, the pair of split-buss let-out pulleys 400a/400b rotates with the axle 120 (and the draw cable pulley 130) about the first pulley assembly axis. As the split-buss let-out pulleys 400a/400b rotate when the bow is drawn, the corresponding secondary power cables 31a/31b are let out by the pulleys 400a/400b (from corresponding spiral grooves 403a/403b, if present). The secondary power cables 31a/31b form the split-buss end of the power cable 31, and are secured to the corresponding split-buss let-out pulleys 400a/400b in any suitable way (e.g., using corresponding anchors 405a/405b). The other end of the power cable 31 (i.e., its take-up end) is taken up by the second pulley assembly 200 when the bow is drawn, and is secured to the second pulley assembly 200 in any suitable way.

In examples that include spiral grooves 403a/403b, each spiral groove 403a/403b is arranged on the corresponding split-buss let-out pulley 400a/400b so that, when the bow is drawn, as the pulley assembly 100 rotates and the corresponding secondary power cables 31a/31b are let-out from the spiral grooves 403a/403b, a contact point 407a/407b of the corresponding secondary power cable 31a/31b within the spiral groove 403a/403b moves laterally away from the draw cable pulley 130. The "contact point" refers to a point on the pulley 400a/400b (within the groove 403a/403b in examples that include spiral grooves) where the corresponding secondary power cable 31a/31b first makes contact with the pulley 400a/400b (within the groove 403a/403b as it enters the groove in examples that include spiral grooves). By comparing FIGS. 2A/3A/5A/7A/9A/10A/11A (bow at brace; arrows indicate directions of cable motions when the bow is drawn) and 2B/3B/5B/7B/9B/10B/11B (bow drawn; dashed lines indicate positions of the cables 31a/31b with the bow at brace), it can be readily seen that the contact points 407a/407b move outward (laterally) away from the draw cable pulley 130 as the bow is drawn. Guiding the positions of the contact points 407a/407b of the secondary power cables 31a/31b, by the corresponding grooves 403a/403b arranged with a suitable pitch, pitch angle, and effective radius, is the primary function of the grooves 403a/403b. The lateral movement of the contact points 407a/407b can in some instances improve bow performance by reducing or mitigating undesirable torque exerted on the axle 120 and transmitted to the bow limb 11, in some instances improving load balance on the axle 120, reducing limb twist, reducing limb vibration, or at least partly compensating cable guard torque as the bow is drawn.

In the example of FIGS. 2A, 2B, 3A, and 3B, the inventive pulley assembly 100 includes a power cable take-up mechanism (specifically, a power cable pulley 150; other suitable take-up mechanisms can be employed) and is therefore suitable for incorporation into a binary cam bow, e.g., as in the example of FIG. 1. The binary cam bow includes the first power cable 31 that is let-out by the first pulley assembly and taken up by the second pulley assembly 200 as the bow is drawn, and a second power cable 32 that is taken up by the first pulley assembly 100 and let-out by the second pulley assembly 200 when the bow is drawn. The pulley assembly 200 in a binary cam bow typically can be substantially identical to, or a substantial mirror image of, the pulley assembly 100, and the following description can apply to both pulley assemblies 100 and 200 in such cases. The power cable pulley 150 is non-rotatably attached to the axle 120 or to the draw cable pulley 130 in any suitable manner, including those described above. The power cable pulley 150 includes a circumferential power cable journal or groove arranged around at least a portion of its periphery; the power cable 32 can be secured to the pulley assembly 100 in any suitable way. When the bow is drawn, the take-up end of the power cable 32 is taken up into the circumferential groove as the power cable pulley 150 rotates with the axle 120 about the first pulley assembly axis, while its split-buss end is let-out by the second pulley assembly 200. Typically the power cable pulley 150 is eccentrically mounted (relative to the axle 120) or non-circular so as to act as a cam as it takes up the second power cable 32 of the binary cam bow. In some examples, the power cable pulley 150 can be integrally formed with one or both of the axle 120 or the draw cable pulley 130; in other examples the power cable pulley 150 can be formed as a separate part and then assembled together with the axle 120 or the draw cable pulley 130 in any suitable way (directly attached, or attached using an intermediate mounting member, or by mechanical indexing of the axle 120 and the power cable pulley 150 by, e.g., mating splines or grooves, by a transverse pin or screw, or other suitable structural arrangement).

In some examples having a power cable pulley 150 separate from the draw cable pulley 130, the power cable pulley 150 can be attached in only a single fixed arrangement (i.e., relative position and orientation); in some other such examples, one or more of the axle 120, the draw cable pulley 130, or the power cable pulley 150 (or a mounting member, if employed) can be structurally arranged so as to enable substantially rigid attachment of the power cable pulley 150 in any one of multiple power cable pulley arrangements (i.e., relative position or orientation). Instead or in addition, the pulley assembly 100 can include one or more cable deflectors for making various fine adjustments to the take-up of the power cable 32. Each one of those multiple power cable pulley arrangements or various deflector adjustments can result in one or more of: (i) a corresponding draw length of the bow that differs from a draw length resulting from at least one different power cable pulley arrangement; (ii) a corresponding draw weight of the bow that differs from a draw weight resulting from at least one different power cable pulley arrangement; (iii) corresponding stored energy of the drawn bow that differs from stored energy of the drawn bow resulting from at least one different power cable pulley arrangement; (iv) a corresponding dependence of draw force on draw distance of the bow that differs from a dependence of draw force on draw distance resulting from at least one different power cable pulley arrangement, or (v) adjustment of timing or synchronization of the pulley assemblies 100 and 200. Several examples of the foregoing arrangements and adjustments are disclosed in some of the references incorporated above. Instead of a power cable pulley 150, in some examples other suitable take-up mechanisms can be employed, e.g., one or more posts arranged so that the power cable 32 wraps around them in sequence as the pulley assembly 100 rotates when the bow is drawn. In some examples, the power cable pulley 150 can be employed in combination with one or more such posts.

In some examples (e.g., as in FIG. 1), with the bow at brace and also during an earlier phase of drawing the bow, the power cable pulley 150 is arranged so that it does not make contact with any portion of the power cable 32. At some intermediate point of the bow's draw, the power cable pulley 150 makes contact with the power cable 32. After that point, during a later phase of drawing the bow, the power cable 32 makes contact with and is taken up by the power cable pulley 150. In other examples, the power cable 32 is in contact with the power cable pulley 150 at brace and throughout drawing of the bow as the power cable 32 is taken up. Both of those types of arrangements shall fall within the scope of the present disclosure or appended claims.

Figure 4:
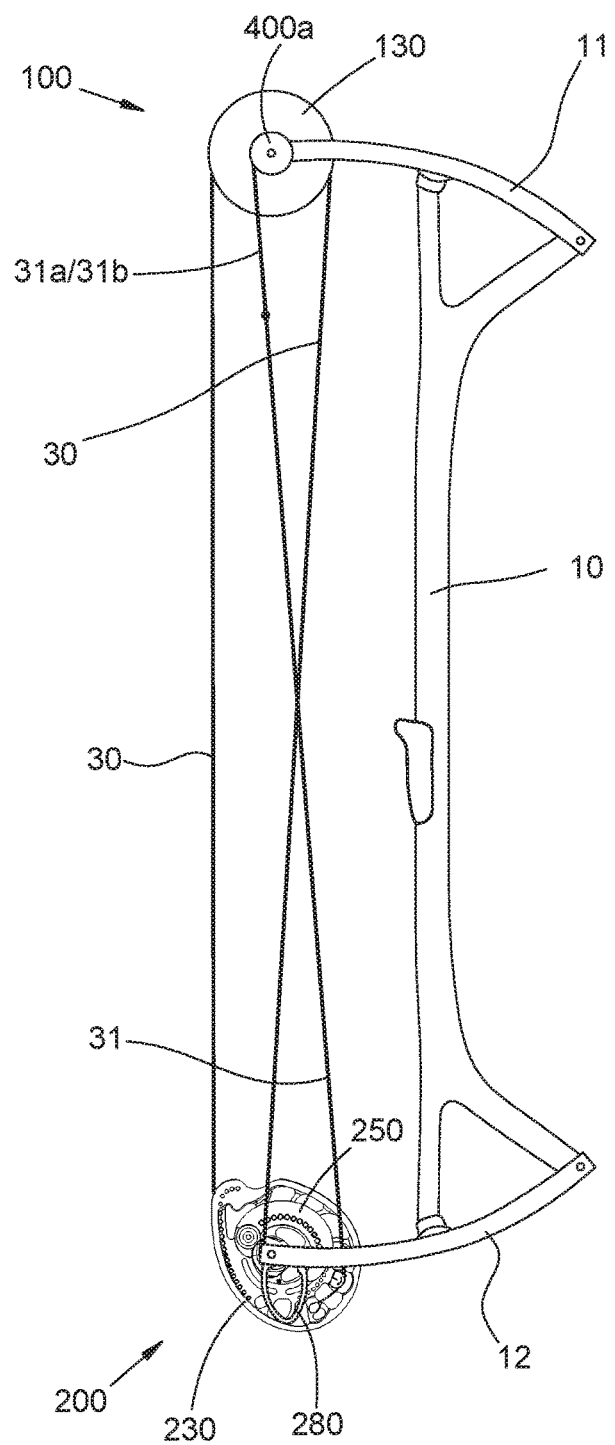
FIG. 4 illustrates schematically an example solo cam compound archery bow incorporating another example inventive pulley assembly.
Figure 5A:
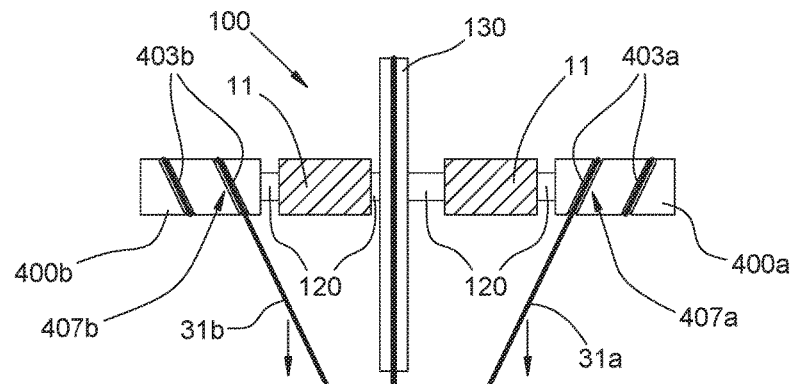
FIGS. 5A and 5B are schematic rear views of an example inventive pulley assembly suitable for incorporation into a solo cam bow, with the solo cam bow at brace and drawn, respectively.
Figure 5B:
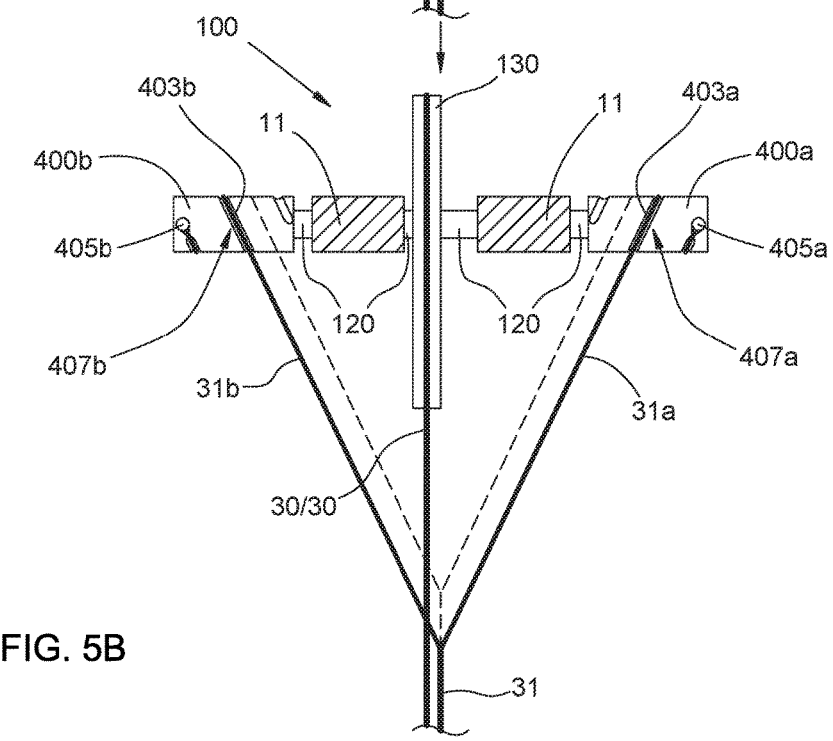

In the example of FIGS. 5A and 5B, the draw cable pulley 130 of the inventive pulley assembly 100 comprises an idler wheel, and is therefore suitable for incorporation into a solo cam compound bow, e.g., as in the example of FIG. 4. The draw cable 30 is secured at both ends thereof to the second pulley assembly 200 and passes around the idler wheel. The draw cable pulley 230 and the power cable take-up mechanism (e.g., power cable pulley 250; other suitable take-up mechanism can be employed) of the second pulley assembly 200 can be arranged in any suitable way for letting out the draw cable 30 and for taking up the take-up end of the power cable 31, including any of those disclosed above for the draw cable pully 130 and the power cable take-up mechanism (e.g., power cable pulley 150) of the pulley assembly 100. The second pulley assembly 200 of the solo cam bow further comprises a draw cable let-out mechanism (e.g., the let-out pulley 280; other suitable let-out mechanisms can be employed); the draw cable let-out mechanism is non-rotatably mounted on the second axle or on the second draw cable pulley 230, in any suitable way, including those described above. When the solo cam bow is drawn and the second pulley assembly 200 rotates, one end of the draw cable 30 is let out by the draw cable pulley 230 while the other end is let out by the draw cable let-out mechanism (e.g., the let-out pulley 280).

Figure 6:
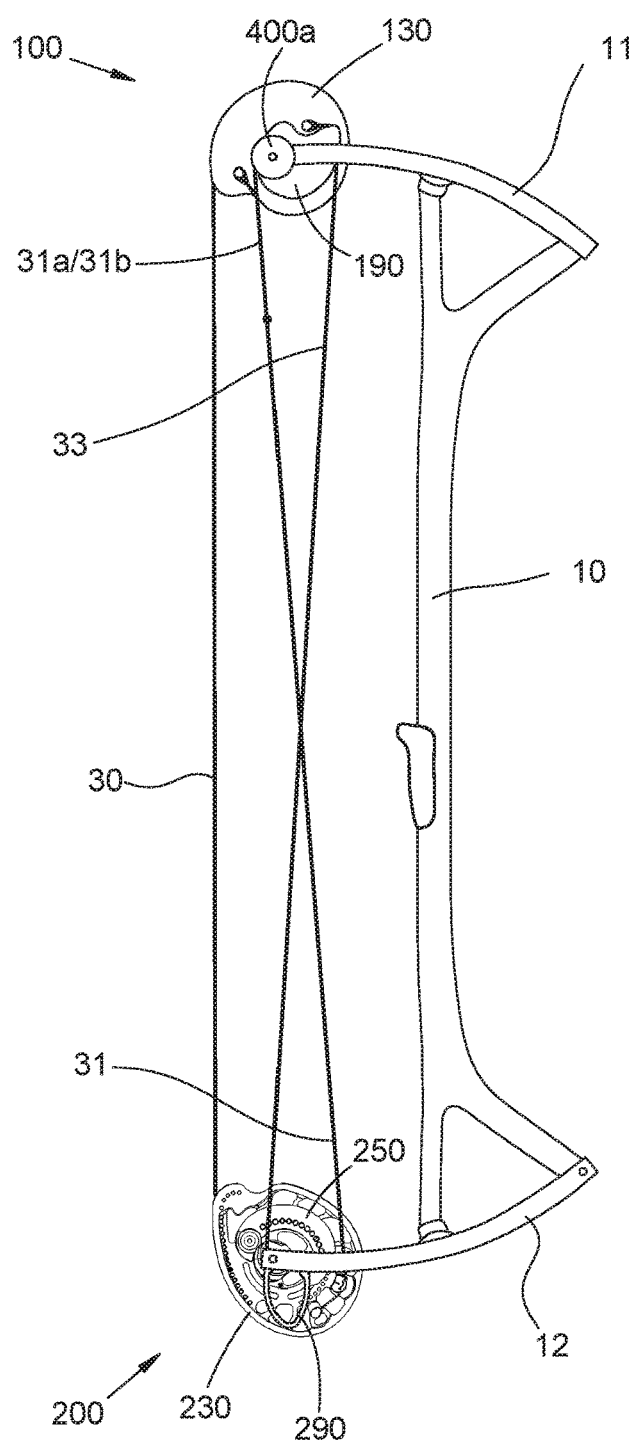
FIG. 6 illustrates schematically an example hybrid cam compound archery bow incorporating another example inventive pulley assembly.
Figure 7A:
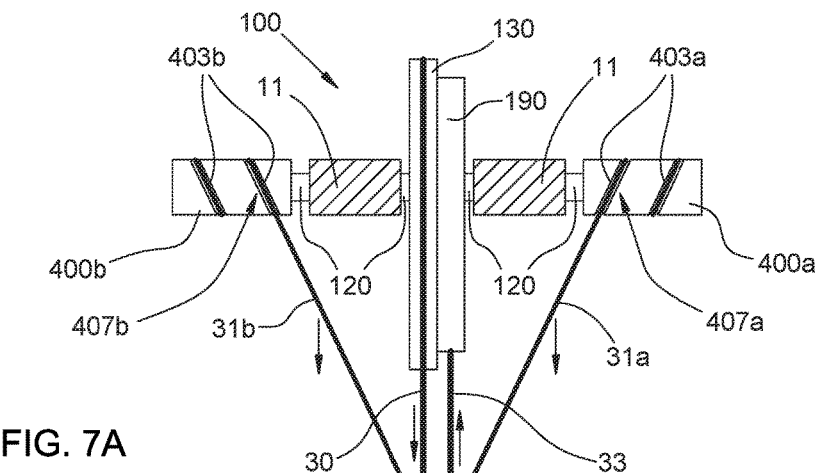
FIGS. 7A and 7B are schematic rear views of an example inventive pulley assembly suitable for incorporation into a hybrid cam bow, with the hybrid cam bow at brace and drawn, respectively.
Figure 7B:
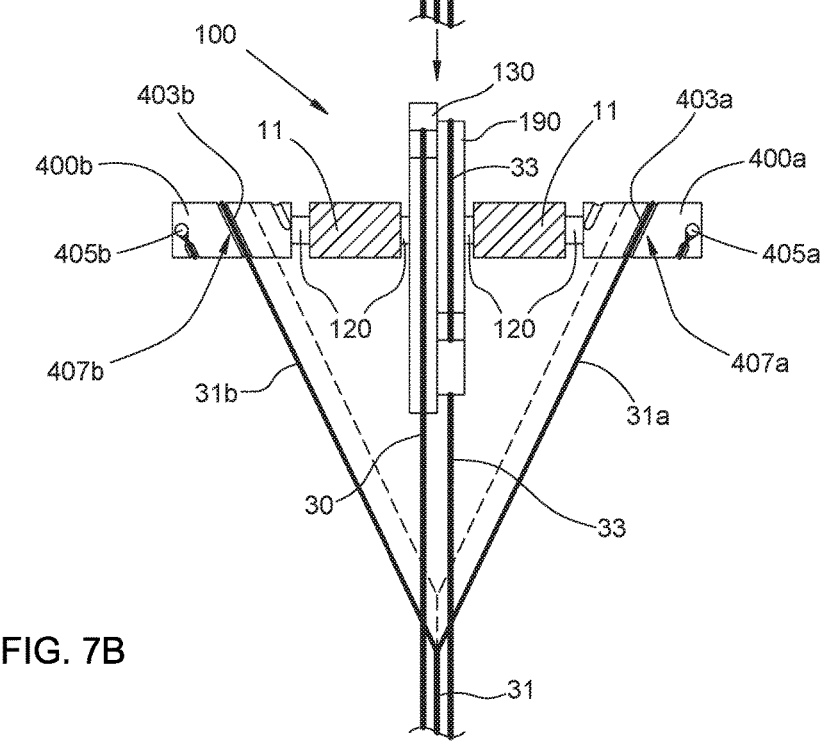

In the example of FIGS. 7A and 7B, the inventive pulley assembly 100 includes a coupling cable take-up mechanism (specifically, a coupling cable take-up pulley 190; other suitable take-up mechanisms can be employed) and is therefore suitable for incorporation into a hybrid cam bow, e.g., as in the example of FIG. 6. The coupling cable take-up mechanism is non-rotatably attached to the axle 120 or to the draw cable pulley 130 in any suitable manner, including those described above. The draw cable pulley 230 and the power cable take-up mechanism (e.g., power cable pulley 250) of the second pulley assembly 200 can be arranged in any suitable way for letting out the draw cable 30 and for taking up the take-up end of the power cable 31, including any of those disclosed above for the draw cable pully 130 and the power cable take-up mechanism (e.g., power cable pulley 150) of the pulley assembly 100. The second pulley assembly 200 of the hybrid cam bow further comprises a coupling cable let-out mechanism (e.g., the let-out pulley 290; other suitable let-out mechanisms can be employed); the coupling cable let-out mechanism is non-rotatably mounted on the second axle or on the second draw cable pulley 230, in any suitable way, including those described above. When the hybrid cam bow is drawn and the second pulley assembly 200 rotates, the draw cable 30 is let out by the draw cable pulley 230 while the coupling cable 33 is let out by the coupling cable let-out mechanism (e.g., the let-out pulley 290).

In some of the examples shown in the drawings, the power cable 31, and the second power cable 32 of a binary cam bow, a portion of the draw cable 30 of a solo cam bow, or the coupling cable 33 of a hybrid cam bow, are shown arranged substantially parallel to the draw cable 30. This is primarily to simplify the drawings; in many real examples, the power cable 31, and the second power cable 32 of a binary cam bow, a portion of the draw cable 30 of a solo cam bow, or the coupling cable 33 of a hybrid cam bow, are deflected laterally somewhere along their lengths by a so-called cable guard, which pulls the cables 31 and 30/32/33 laterally out of the way of the arrow path. In a compound bow with a cable guard, the cables 31 and 30/32/33 therefore typically would not be parallel to the draw cable 30. Inventive pulleys assemblies disclosed or claimed herein can be employed in a compound bow with or without a cable guard, or with cables 31 and 30/32/33 that are parallel to the draw cable or not.

The pitch of the grooves 403a/403b determines the rate at which the contact points 407a/407b move laterally as the bow is drawn. The pitch is defined herein as the lateral distance the contact points 407a/407b move per degree of rotation of the pulley assembly 100; in some examples the pitch can remain constant during rotation of the pulley assembly 100, while in other examples the pitch can vary with rotation angle (along the corresponding spiral groove, if present). A pitch angle is determined by the pitch and the effective radius of the let-out pulleys 400a/400b at the contact points 407a/407b; in some examples the pitch angle can remain constant during rotation of the pulley assembly, while in other examples the pitch angle can vary with rotation angle (e.g., due to varying pitch or varying effective radius or both; along the corresponding spiral groove, if present). The effective radius (equivalently, the let-out lever arm) of the let-out pulleys 400a/400b is defined as the distance from the rotation axis to the contact points 407a/407b, and along with the pitch angle determines the let-out rate of the secondary power cables 31a/31b. (i.e., the length of the secondary power cables 31a/31b let-out per degree of rotation of the pulley assembly 100). In some examples the effective radius can remain substantially constant during rotation of the pulley assembly 100 (if the let-out pulley is concentric and substantially cylindrical, i.e., with a substantially circular cross section with a substantially constant radius along the length of the let-out pulley 400a/400b), while in other examples the effective radius can vary with rotation angle (if the let-out pulley is eccentric, non-circular, or frusto-conical). The effective let-out rate of the split-buss end of the power cable 31 in turn depends on the let-out rate of the secondary power cables 31a/31b and the angle of those secondary cables relative to the power cable 31.

Figure 2A:
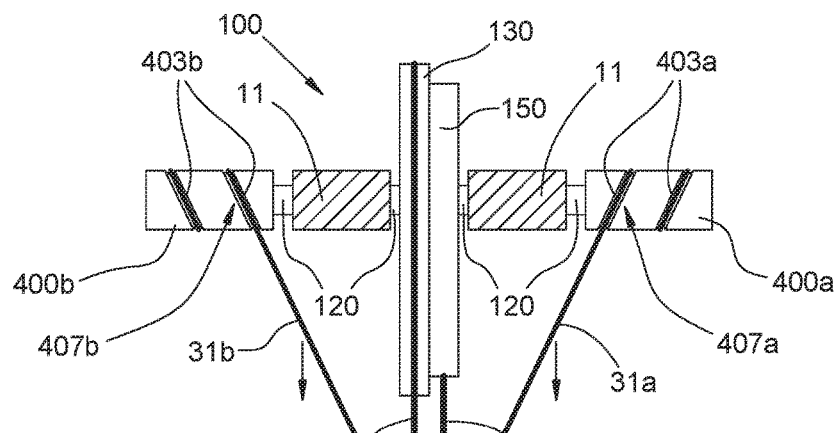
FIGS. 2A and 2B are schematic rear views of an example inventive pulley assembly suitable for incorporation into a binary cam bow, with the binary cam bow at brace and drawn, respectively.
Figure 2B:
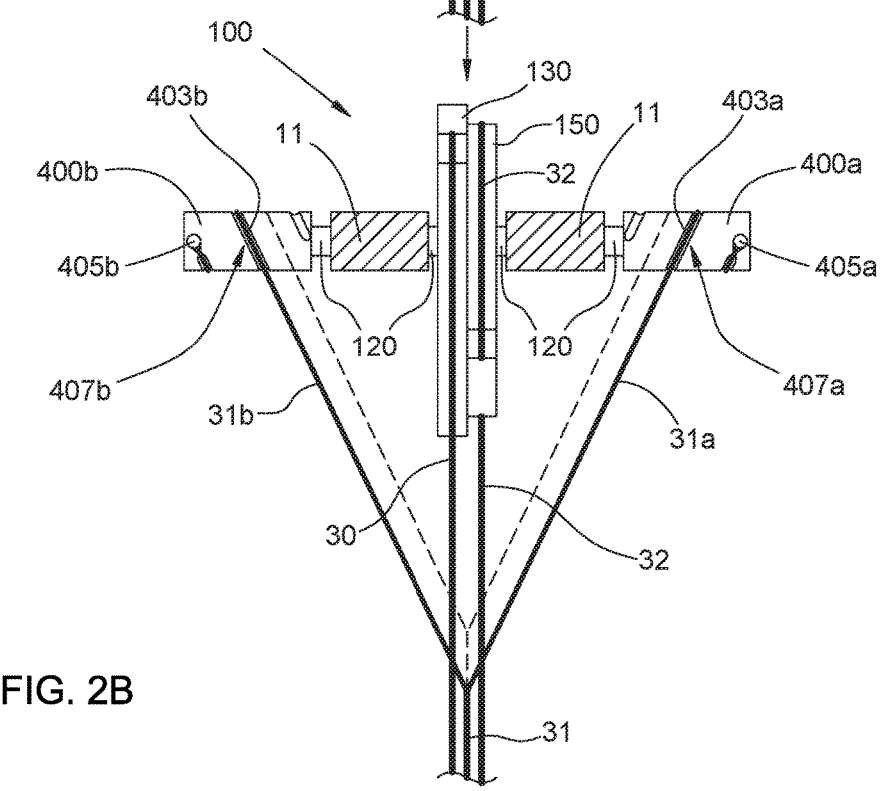

Myriad combinations of pitch, pitch angle, effective radius, secondary cable angle, variation of any one or more or all of those parameters with rotation of the pulley assembly 100 (along the spiral groove, if present), or differences of any one or more or all of those parameters or variations between the split-buss let-out pulleys 400a/400b, can be employed to achieve suitable, desirable, or necessary performance characteristics of the compound bow. In the examples of FIGS. 2A/2B/3A/3B, 5A/5B, and 7A/7B, the pitch, pitch angle, effective radius, and secondary cable angles are the same for both let-out pulleys 400a/400b and both cables 31a/31b, and are substantially constant during rotation of the pulley assembly 100. In addition, the angles of the secondary cables 31a/31b are about the same as the corresponding pitch angles.

Figure 9A:
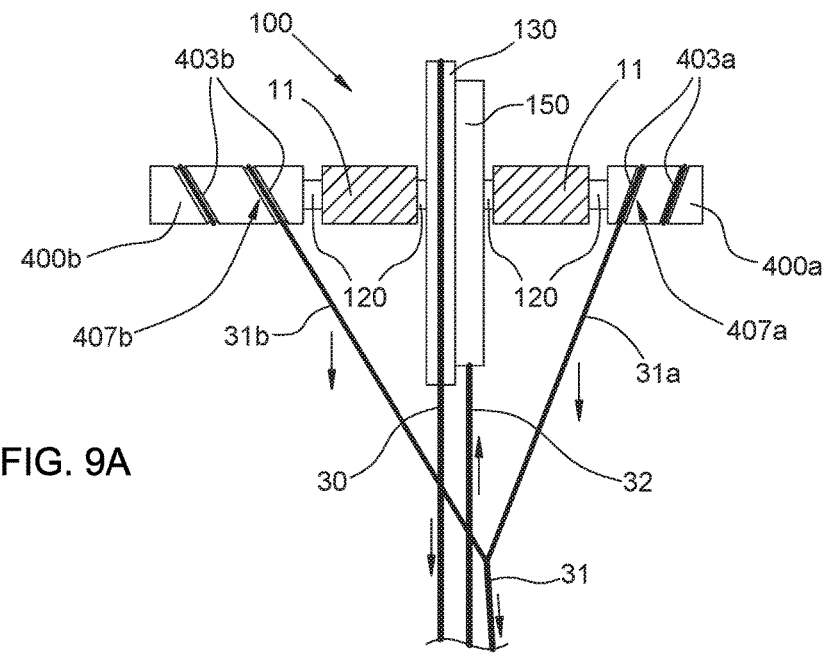
FIGS. 9A and 9B are schematic rear views of an alternative example inventive pulley assembly suitable for incorporation into a binary cam bow, with the binary cam bow at brace and drawn, respectively.
Figure 9B:
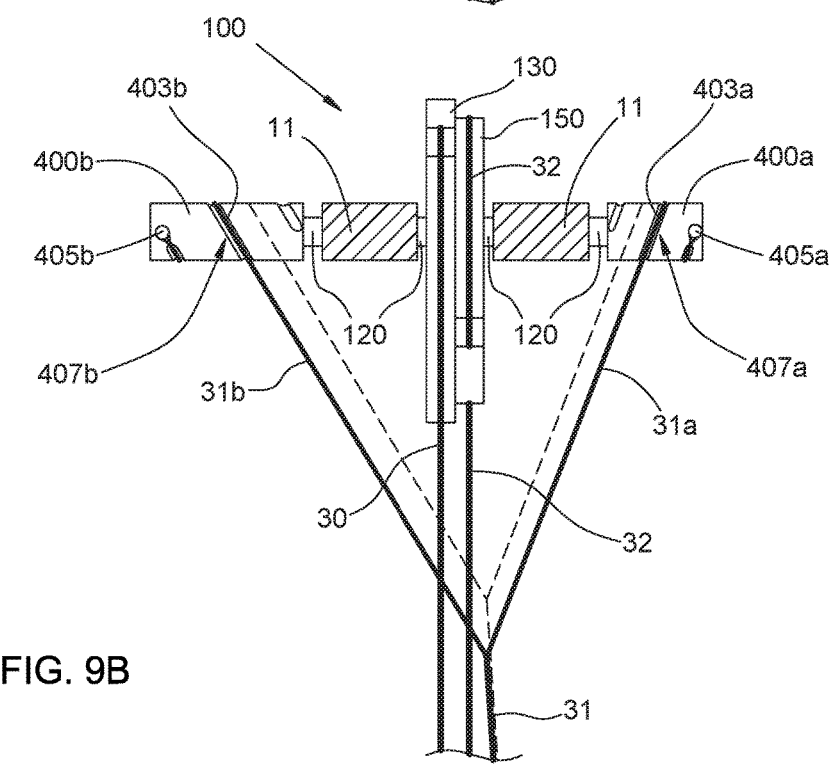

In the example of FIGS. 9A and 9B, the corresponding pitches, pitch angles, and secondary cable angles differ between the let-out pulley 400a and cable 31a versus the let-out pulley 400b and cable 31b; in this example those parameters remain substantially constant with rotation of the pulley assembly 100. The example pulley assembly 100 of FIGS. 9A and 9B is arranged for use in a binary cam bow; a pulley assembly arranged for use in a solo cam bow or a hybrid cam bow can be similarly arranged to include differing pitches, pitch angles, and secondary cable angles between the two let-out pulleys 400a/400b.

Figure 10A:
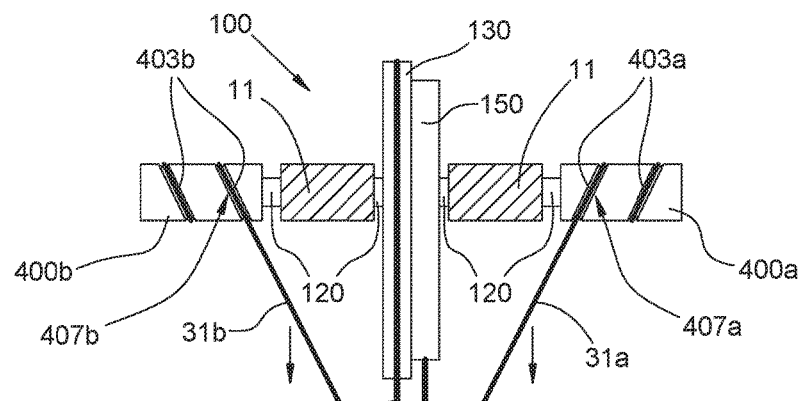
FIGS. 10A and 10B are schematic rear views of an alternative example inventive pulley assembly suitable for incorporation into a binary cam bow, with the binary cam bow at brace and drawn, respectively.
Figure 10B:
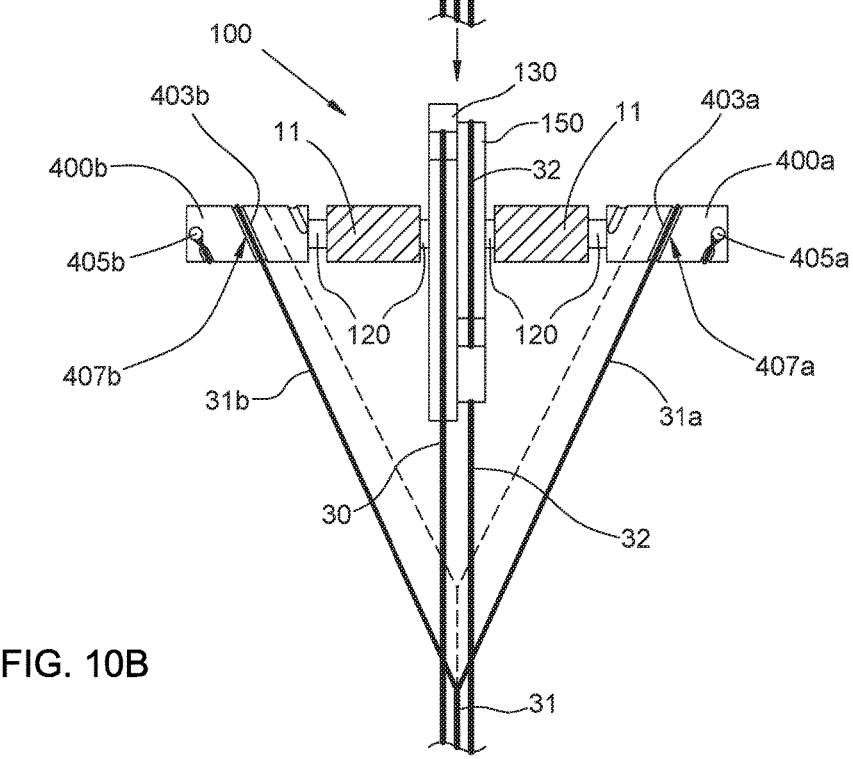

In the example of FIGS. 10A and 10B the corresponding pitches, pitch angles, and secondary cable angles are the same for both of the let-out pulleys 400a/400b, but vary with rotation of the pulley assembly 100. In this specific example, the pitch and pitch angle decrease as the bow is drawn and the pulley assembly 100 rotates (most readily apparent from the differing secondary cable angles shown in FIG. 10B at full draw versus at brace). The example pulley assembly 100 of FIGS. 10A and 10B is arranged for use in a binary cam bow; a pulley assembly arranged for use in a solo cam bow or a hybrid cam bow can be similarly arranged to include pitch, pitch angle, and secondary cable angle that vary with rotation of the pulley assembly 100.

In the examples shown that include grooves 403a/403b, the pulley assembly 100 and the split-buss end of the power cable 31 are arranged so that the angles of the secondary power cables 31a/31b are roughly the same as the corresponding pitch angles of the grooves 403a/403b. That condition results in little or no interference between the edges of the grooves 403a/403b with the corresponding cables 31a/31b at the contact points 407a/407b as the bow is drawn, the pulley assembly 100 rotates, and the secondary power cables 31a/31b are let out from the grooves 403a/403b. Such an aligned arrangement can reduce wear on the secondary power cables 31a/31b or on the grooves 403a/403b. However, inventive pulley assemblies can be employed wherein the angles of the secondary cables 31a/31b are not aligned with the pitch angles of the corresponding grooves 403a/403b. In such non-aligned examples, the pitch of the groove 403a/403b still determines the rate of movement of the corresponding contact point 407a/407b, and the corresponding secondary power cables 31a/31b bend at the contact points 407a/407b while rubbing against the groove edge where they exit the grooves 403a/403b.

Figures 11A, 11B:
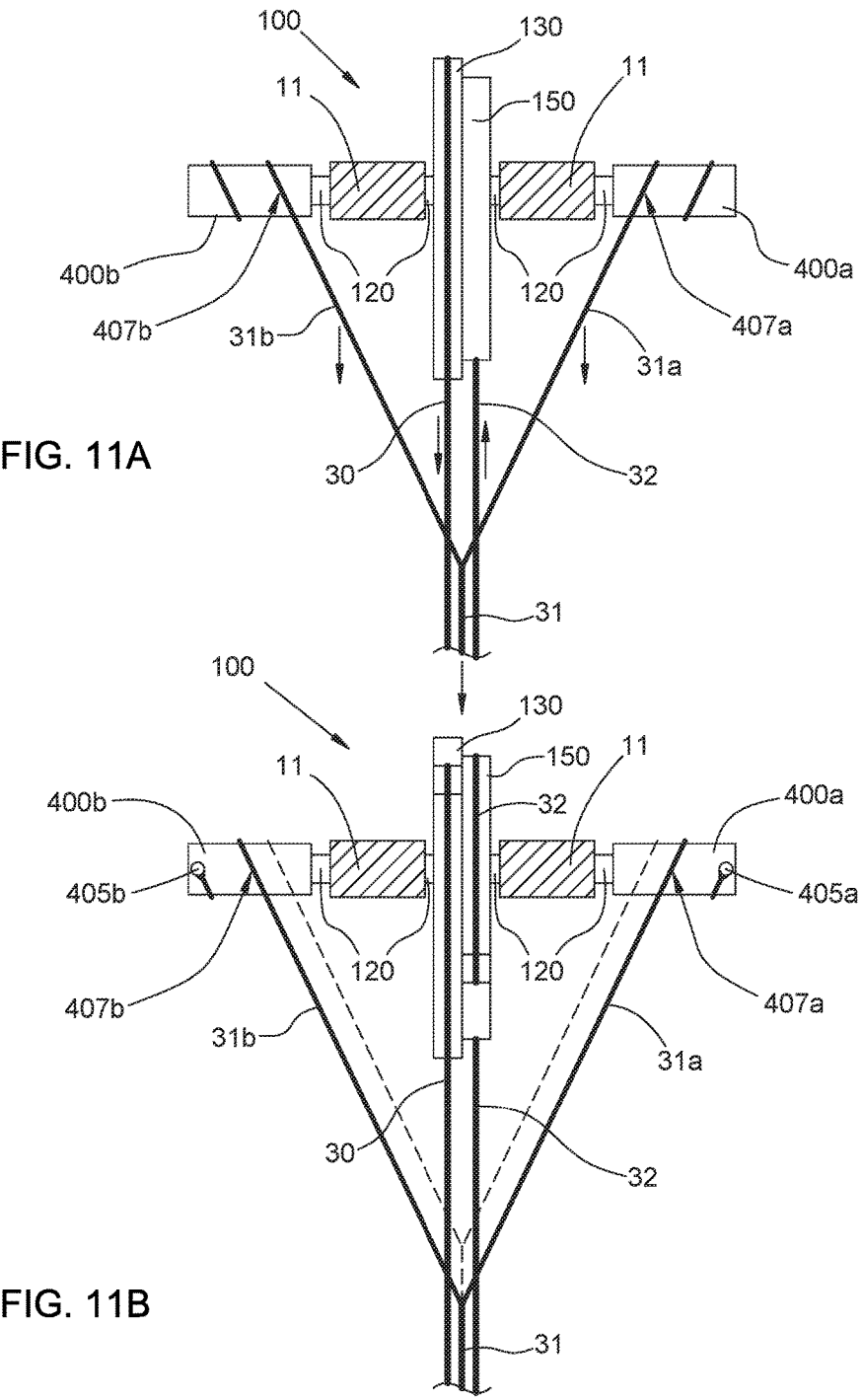
FIGS. 11A and 11B are schematic rear views of an alternative example inventive pulley assembly suitable for incorporation into a binary cam bow, with the binary cam bow at brace and drawn, respectively.

In the example of FIGS. 11A and 11B, the split-buss let-out pulleys 400a/400b do not include grooves; the secondary power cables 31a/31b are simply wound around the corresponding let-out pulleys 400a/400b in a spiral arrangement. The contact points 407a/407b move laterally as the bow is drawn and the pulley assembly 100 rotates, but those contact points are not constrained by the presence of grooves on the let-out pulleys 400a/400b. As the bow is drawn and the "grooveless" pulley assembly 100 rotates, the forces exerted on the secondary power cables 31a/31b determine the effective pitches, pitch angles, and cable angles assumed by the cables 31a/31b as a function of rotation angle. The example pulley assembly 100 of FIGS. 11A and 11B is in a sense self-adjusting, in that the secondary cables 31a/31b can realign themselves, independently and dynamically, in response to differing or varying forces exerted on them as the bow is drawn. In some examples, that self-adjusting property might not necessarily result in optimal alignment of the pulley assembly or bow with respect to its shooting characteristics. In some instances such optimization can require the additional constraints imposed by the presence of grooves 403a/403b. The example pulley assembly 100 of FIGS. 11A and 11B is arranged for use in a binary cam bow; a pulley assembly arranged for use in a solo cam bow or a hybrid cam bow can be similarly arranged to include split-buss let-out pulleys 400a/400b that lack grooves.

In the previous examples, effective radius of the split-buss let-out pulleys 400a/400b, and any variation thereof with respect to rotation of the pulley assembly 100, is the same for both let-out pulleys 400a/400b. In other examples (not shown), effective radius, or variation thereof with respect to rotation of the pulley assembly 100, of each let-out pulley 400a/400b can differ from the other.

Selection of suitable combinations of the various parameters discussed above (e.g., pitch, pitch angle, effective radius, secondary cable angle, differences on any one or more or all of those parameters between the let-out pulleys 400a/400b, or variation of any one or more or all of those parameters with rotation of the pulley assembly 100) provide many adjustments that can be made to improve bow performance by, e.g., reducing or mitigating undesirable torque exerted on the axle 120 and transmitted to the bow limb 11, in some instances improving load balance on the axle 120, reducing limb twist, reducing limb vibration, or at least partially compensating cable guard torque as the bow is drawn.

In some examples, the power cable take-up mechanism and the split-buss let-out pulleys 400a/400b are arranged so as to avoid 100% let-off of draw force of the bow or so as to prevent cocking of the bow (sometimes also referred to a locking of the bow; a condition wherein the draw force goes to zero and the draw cable goes slack with the limbs flexed). In some examples a rotation stop can be employed to prevent reaching the cocked condition. In some examples, the power cable take-up mechanism and the split-buss let-out pulleys 400a/400b are arranged so that a ratio between a take-up lever arm of the power cable take-up mechanism and a let-out lever arm (i.e., the effective radius) of the split-buss let-out pulleys 400a/400b remains greater than 1:1 during drawing of the bow, thereby avoiding the cocked condition.

In binary cam bows, one or both of those results can be achieved by suitable arrangement of the split-buss let-out pulleys 400a/400b relative to the power cable take-up mechanism in both pulley assemblies 100 and 200. In solo and hybrid cam bows, one or both of those results can be achieved by suitable arrangement of the split-buss let-out pulleys 400a/400b of the first pulley assembly 100 relative to the power cable take-up mechanism of the second pulley assembly 200.

Figure 13A:
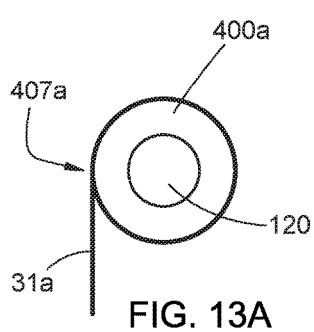
FIGS. 13A through 13C illustrate schematically various arrangements of split-buss let-out pulleys on an axle of a pulley assembly.
Figure 13B:
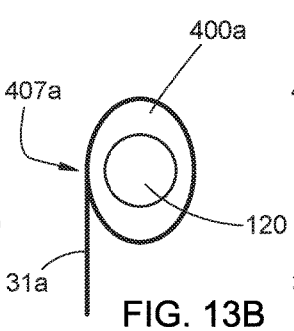
Figure 13C:
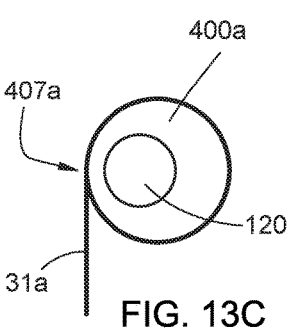

In some examples, the split-buss let-out pulleys 400a/400b are substantially cylindrical and mounted concentrically with respect to the axle 120 (e.g., as in FIG. 13A, with a radius that is substantially invariant along the let-out pulley 400a/400b); that arrangement results in an effective radius of the let-out pulleys 400a/400b that remains substantially constant during drawing of the bow. In some other examples, the split-buss pulleys 400a/400b can be frusto-conical (e.g., as in FIG. 13A, with a radius that varies along the let-out pulley 400a/400b), non-circular in cross section (e.g., as in FIG. 13B), or mounted eccentrically with respect to the axle 120 (e.g., as in FIG. 13C); those arrangements result in an effective radius that varies during drawing of the bow.

In some examples, the draw cable pulley 130 and the axle 120 are indexed to non-rotatably engage one another at a selected relative angular position; in some instances the draw cable pulley 130 and the axle 120 are indexed to non-rotatably engage one another at a single, substantially fixed relative angular position, while in other instances the draw cable pulley 130 and the axle 120 are indexed to non-rotatably engage one another at any selected one of multiple relative angular positions (discrete in some examples; continuously variable in other examples). Similarly, in some examples, the split-buss cable let-out pulleys 400a/400b and the axle 120 are indexed to non-rotatably engage one another at a selected relative angular position; in some instances the split-buss cable let-out pulleys 400a/400b and the axle 120 are indexed to non-rotatably engage one another at a single, substantially fixed relative angular position, while in other instances the split-buss cable let-out pulleys 400a/400b and the axle 120 are indexed to non-rotatably engage one another at any selected one of multiple relative angular positions (discrete in some examples; continuously variable in other example). In all of those examples, any suitable structural arrangement can be employed for indexing, e.g., by mating splines or grooves, by one or more pins or screws, one or more mating flanges, or other suitable structural arrangement. In the examples shown, the anchors 405a/405b can serve a dual purpose: corresponding screws can be employed to non-rotatably engage the split-buss let-out pulleys 400a/400b to the axle 120 (by passing through the corresponding pulley 400a/400b and being threaded into the axle 120), while the protruding heads of those screws serve as the anchors 405a/405b.

Figure 8A:
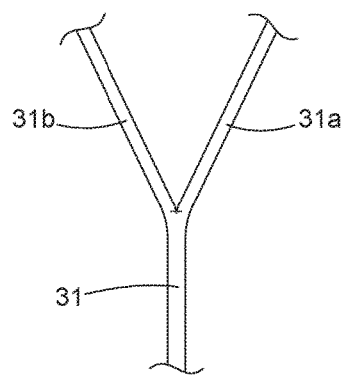
FIGS. 8A through 8D illustrate schematically various split-buss arrangements of a power cable for a compound archery bow.
Figure 8B:
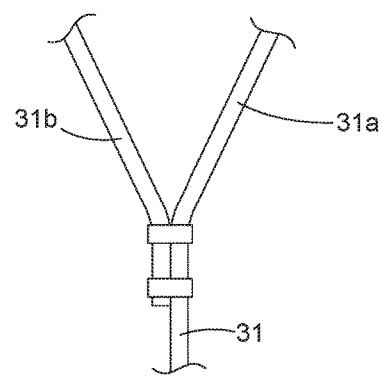
Figure 8C:
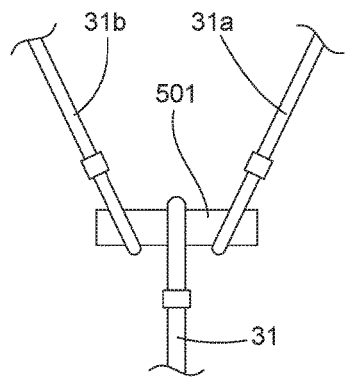
Figure 8D:
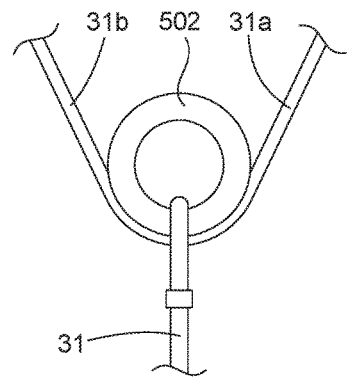

Any suitable split-buss arrangement can be employed for the power cable 31 and the secondary power cables 31a/31b (and similarly for the second power cable 32 and the secondary power cables 32a/32b, if present). In the example of FIG. 8A, the pair of secondary power cables 31a/31b comprises a pair of bifurcated end segments of the split-buss end of the first power cable 31; each one of the bifurcated end segments is attached to a corresponding one of the split-buss let-out pulleys 400a/400b. In the example of FIG. 8B, the secondary power cable 31a comprises an end segment of the split-buss end of the first power cable 31 that is attached to the split-buss let-out pulley 400a; the secondary power cable 31b comprises an additional, discrete cable segment that is attached at one end to the split-buss let-out pulley 400b and attached at its other end thereof to the power cable 31 at a point displaced from the split-buss end of power cable 31. In the example of FIG. 8C, the power cable 31 is attached to a cylindrical coupling member 501 (other shapes or arrangements can be employed); the secondary power cable 31a comprises a first additional, discrete cable segment attached at one end to the split-buss let-out pulley 400a and at its other end to the coupling member 501; the secondary power cable 31b comprises a second additional, discrete cable segment attached at one end to the split-buss let-out pulley 400b and at its other end to the coupling member 501. In the example of FIG. 8D, the power cable 31 is attached to a circular yoke 502 (other shapes or arrangements can be employed); the secondary power cables 31a/31b comprise a single, discrete, additional cable segment that is attached at one end to the split-buss let-out pulley 400a, attached at its other end to the split-buss let-out pulley 400b, and looped around the yoke 502. In examples arranged as shown in FIG. 8D, the yoke 502 can be arranged to permit its movement along the cable segment (e.g., by inclusion of a bearing portion), thereby enabling the relative lengths of the secondary power cables 31a/31b to vary as the bow is drawn if the yoke 502 moves along the cable segment. The bearing portion can be of a frictional, rolling, or other suitable type. Other suitable split-buss arrangements can be employed.

Figures 12A, 12B:
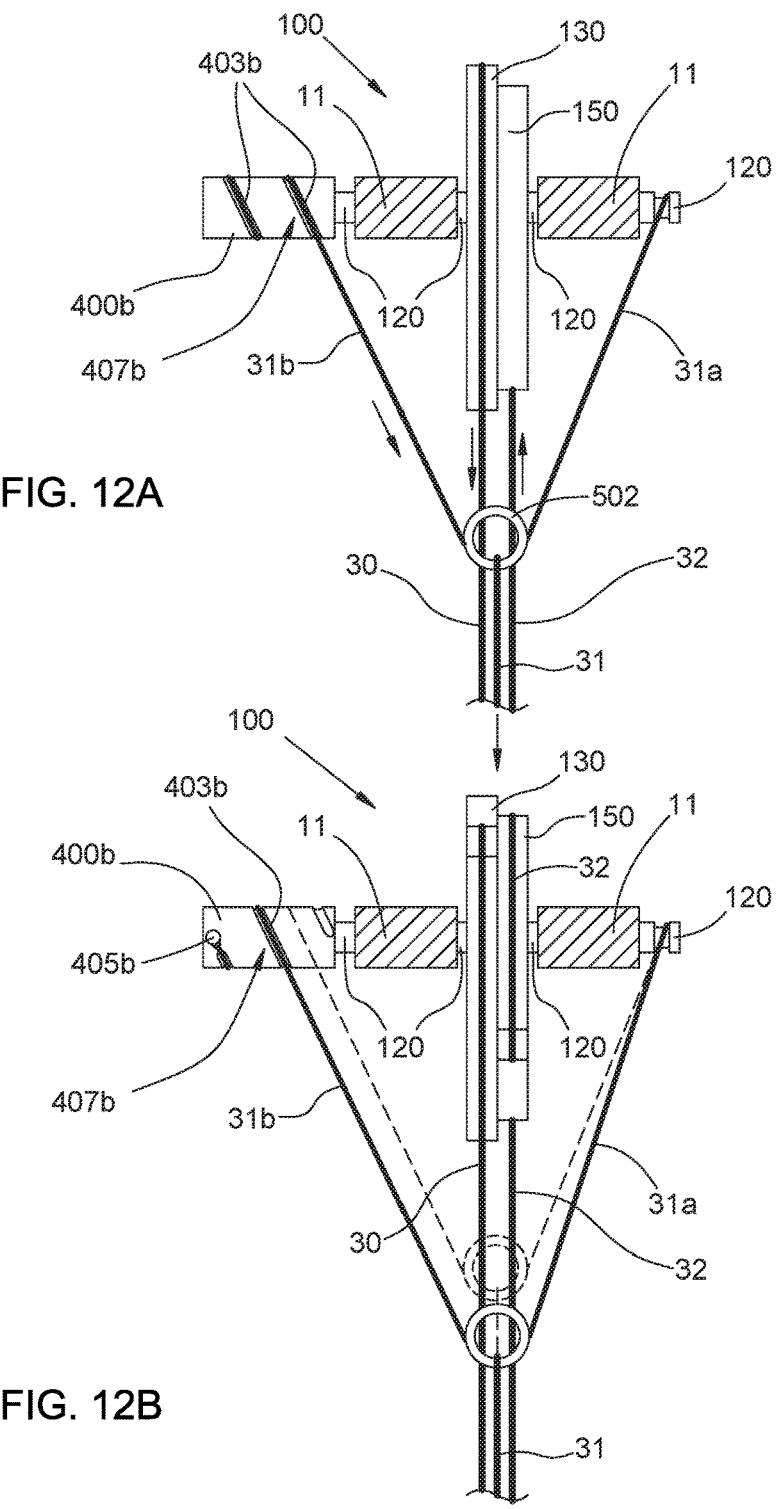
FIGS. 12A and 12B are schematic rear views of an alternative example inventive pulley assembly suitable for incorporation into a binary cam bow, with the binary cam bow at brace and drawn, respectively.

In the example of FIGS. 12A and 12B, a split-buss arrangement similar to that of FIG. 8D is employed, and the yoke 502 is arranged so as to enable its movement along the length of the single cable segment that forms the secondary power cables 31a/31b (e.g., by inclusion of a suitable bearing portion as described above). The example of FIGS. 12A and 12B differs from other examples shown in that the pulley assembly 100 includes only one split-buss let-out pulley 400b. The first end of the single cable segment (that is also the secondary power cable 31a) is connected to the axle 120 (as in FIGS. 12A/12B) or to the limb 11 (not shown), and is not arranged for any take-up or let-out. The second end of the single cable segment (that is also the secondary power cable 31b) is wound in a spiral arrangement around the single let-out pulley 400b in any of the ways described above. As the bow is drawn and the pulley assembly 100 rotates, the secondary power cable 31b is let-out from the single let-out pulley 400b, the contact point 407b moves laterally away from the draw cable pulley 130, and the yoke 502 moves along the cable segment so as to lengthen the secondary power cable 31a. The single let-out pulley 400b can include a groove 403b or not; pitch, pitch angle, effective radius, and cable angle can be arranged in any suitable way, including those described above. The example pulley assembly 100 of FIGS. 12A and 12B is arranged for use in a binary cam bow; a pulley assembly arranged for use in a solo cam bow or a hybrid cam bow can be similarly arranged to include only a single split-buss let-out pulley 400b.

In addition to the preceding, the following examples fall within the scope of the present disclosure or appended claims:

Example 1

A pulley assembly for a compound archery bow, the pulley assembly comprising an axle, a draw cable pulley, and a pair of split-buss let-out pulleys positioned on opposite sides of the draw cable pulley, wherein: (a) the axle is structurally arranged so as to (i) define a first pulley assembly transverse rotation axis and (ii) be rotatably mounted on a first limb of a compound archery bow to rotate about the first pulley assembly axis; (b) the draw cable pulley is (i) non-rotatably mounted on the axle and (ii) structurally arranged so as to let out, from a circumferential draw cable groove thereof, a draw cable of the archery bow, when the bow is drawn and the draw cable pulley rotates with the axle about the first pulley assembly axis; (c) each split-buss let-out pulley is (i) non-rotatably mounted on the axle, and (ii) structurally arranged so as to let out a corresponding one of two secondary power cables of a split-buss end of a first power cable of the archery bow, when the bow is drawn and the pair of split-buss let-out pulleys rotates with the axle about the first pulley assembly axis; and (d) each split-buss let-out pulley is structurally arranged to have wound therearound the corresponding secondary power cable in a spiral arrangement so that, when the bow is drawn, as the pulley assembly rotates and the corresponding secondary power cable is let-out from the split-buss let-out pulley, a contact point of the corresponding secondary power cable on the split-buss let-out pulley moves laterally away from the draw cable pulley.

Example 2

The pulley assembly of Example 1 wherein one or more of pitch, pitch angle, effective radius, or secondary cable angle of the spiral arrangements of the secondary power cables wound around the corresponding split-buss let-out pulleys differ between the split-buss let-out pulleys.

Example 3

The pulley assembly of any one of Examples 1 or 2 wherein one or more of pitch, pitch angle, effective radius, or secondary cable angle of the spiral arrangement of at least one of the secondary power cables wound around the corresponding split-buss let-out pulley vary during drawing of the bow.

Example 4

The pulley assembly of any one of Examples 1 through 3 wherein each split-buss let-out pulley includes a corresponding circumferential spiral groove structurally arranged so as to receive therein the corresponding secondary power cable wound therearound in the spiral arrangement, and the corresponding spiral groove is structurally arranged on the split-buss let-out pulley so that, when the bow is drawn, as the first pulley assembly rotates and the corresponding secondary power cable is let-out from the corresponding spiral groove, the contact point of the corresponding secondary power cable within the spiral groove moves laterally away from the first draw cable pulley.

Example 5

The pulley assembly of any one of Examples 1 through 4 wherein one or more of pitch, pitch angle, or effective radius of the spiral grooves of the corresponding split-buss let-out pulleys differ between the split-buss let-out pulleys.

Example 6

The pulley assembly of any one of Examples 1 through 5 wherein one or more of pitch, pitch angle, or effective radius of the corresponding spiral groove of at least one of the split-buss let-out pulleys vary along the corresponding spiral groove.

Example 7

The pulley assembly of any one of Examples 1 through 6 further comprising a power cable take-up mechanism, wherein the power cable take-up mechanism is (i) non-rotatably mounted on the axle or on the draw cable pulley and (ii) structurally arranged so as to take up a take-up end of a second power cable of a binary cam archery bow, when the bow is drawn and the power cable pulley rotates with the axle about the first pulley assembly axis.

Example 8

The pulley assembly of Example 7 wherein the power cable take-up mechanism comprises a power cable pulley structurally arranged so as to take up, into a corresponding circumferential groove thereof, the take-up end of the second power cable, when the bow is drawn and the power cable pulley rotates with the axle about the first pulley assembly axis.

Example 9

The pulley assembly of any one of Examples 7 or 8 further comprising a second pulley assembly, wherein the pulley assembly and the second pulley assembly are substantially identical to one another, or are substantial mirror images of one another.

Example 10

The pulley assembly of any one of Examples 7 through 9 wherein the power cable take-up mechanism and the split-buss let-out pulleys are structurally arranged so as to avoid 100% let-off of draw force of the bow or so as to prevent cocking of the bow.

Example 11

The pulley assembly of any one of Examples 7 through 10 wherein the power cable take-up mechanism and the split-buss let-out pulleys are structurally arranged so that a ratio between a take-up lever arm of the power cable take-up mechanism and a let-out lever arm of the split-buss let-out pulleys remains greater than 1:1 during drawing of the bow.

Example 12

The pulley assembly of any one of Examples 1 through 6 wherein the draw cable pulley comprises an idler wheel of a solo cam compound bow.

Example 13

The pulley assembly of any one of Examples 1 through 6 further comprising a coupling cable take-up mechanism, wherein the coupling cable take-up mechanism is (i) non-rotatably mounted on the axle or on the draw cable pulley and (ii) structurally arranged so as to take up a coupling cable of a hybrid cam archery bow, when the bow is drawn and the draw cable pulley rotates with the axle about the first pulley assembly axis.

Example 14

The pulley assembly of any one of Examples 1 through 13 wherein both of the split-buss let-out pulleys are substantially cylindrical and mounted concentrically with respect to the axle.

Example 15

The pulley assembly of any one of Examples 1 through 13 wherein both of the split-buss let-out pulleys are non-circular, frusto-conical, or mounted eccentrically with respect to the axle.

Example 16

The pulley assembly of any one of Examples 1 through 15 wherein (i) the draw cable pulley and the axle are indexed to non-rotatably engage one another at a selected relative angular position, or (ii) each split-buss cable let-out pulley and the axle are indexed to non-rotatably engage one another at a selected relative angular position.

Example 17

The pulley assembly of any one of Examples 1 through 16 wherein (i) the draw cable pulley and the axle are indexed to non-rotatably engage one another at a single, substantially fixed relative angular position, or (ii) each split-buss cable let-out pulley and the axle are indexed to non-rotatably engage one another at a single, substantially fixed relative angular position.

Example 18

The pulley assembly of any one of Examples 1 through 16 wherein (i) the draw cable pulley and the axle are indexed to non-rotatably engage one another at any selected one of multiple relative angular positions, or (ii) each split-buss cable let-out pulley and the axle are indexed to non-rotatably engage one another at any selected one of multiple relative angular positions.

Example 19

A compound archery bow comprising: (a) a substantially rigid riser; (b) a first resilient bow limb extending from a first end portion of the riser and a second resilient bow limb extending from a second end portion of the riser; (c) a draw cable and a first power cable; (d) a first pulley assembly comprising a first axle, a first draw cable pulley, and a pair of split-buss let-out pulleys positioned on opposite sides of the first draw cable pulley, wherein (i) the first axle is rotatably mounted on the first limb so as to define and rotate about a first pulley assembly transverse rotation axis, (ii) the first draw cable pulley is non-rotatably mounted on the first axle, and (iii) the first draw cable pulley is structurally arranged so as to let out the draw cable, from a circumferential draw cable groove of the first draw cable pulley, when the bow is drawn and the first draw cable pulley rotates with the first axle about the first pulley assembly axis; and (e) a second pulley assembly comprising a second axle, a second draw cable pulley, and a take-up mechanism for the first power cable, wherein (i) the second axle is mounted on the second limb so as to define a second pulley assembly transverse rotation axis, (ii) the second draw cable pulley is mounted on the second axle so as to rotate about the second pulley assembly axis, (iii) the second draw cable pulley is structurally arranged so as to let out the draw cable, from a circumferential draw cable groove of the second draw cable pulley, when the bow is drawn and the second draw cable pulley rotates about the second pulley assembly axis, (iv) the first-power-cable take-up mechanism is non-rotatably mounted on the second axle or on the second draw cable pulley, and (v) the first-power-cable take-up mechanism is structurally arranged so as to take-up a take-up end of the first power cable, when the bow is drawn and the first-power-cable take-up mechanism rotates with the second draw cable pulley about the second pulley assembly axis, wherein: (f) each split-buss let-out pulley of the first pulley assembly is (i) non-rotatably mounted on the first axle, and (ii) structurally arranged so as to let out a corresponding one of two secondary power cables of a split-buss end of the first power cable, when the bow is drawn and the pair of split-buss let-out pulleys rotates with the first axle about the first pulley assembly axis; and (g) each split-buss let-out pulley is structurally arranged to have wound therearound the corresponding secondary power cable of the first power cable in a spiral arrangement so that, when the bow is drawn, as the first pulley assembly rotates and the corresponding secondary power cable is let-out from the split-buss let-out pulley, a contact point of the corresponding secondary power cable on the split-buss let-out pulley moves laterally away from the first draw cable pulley.

Example 20

The bow of Example 19 wherein one or more of pitch, pitch angle, effective radius, or secondary cable angle of the spiral arrangements of the secondary power cables wound around the corresponding split-buss let-out pulleys differ between the split-buss let-out pulleys.

Example 21

The bow of any one of Examples 19 or 20 wherein one or both of the first pulley assembly or the split-buss end of the first power cable are structurally arranged so that one or more of pitch, pitch angle, effective radius, or secondary cable angle of the spiral arrangement of at least one of the secondary power cables wound around the corresponding split-buss let-out pulley vary during drawing of the bow.

Example 22

The bow of any one of Examples 19 through 21 wherein each split-buss let-out pulley includes a corresponding circumferential spiral groove structurally arranged so as to receive therein the corresponding secondary power cable wound therearound in the spiral arrangement, and the corresponding spiral groove is structurally arranged on the split-buss let-out pulley so that, when the bow is drawn, as the first pulley assembly rotates and the corresponding secondary power cable is let-out from the corresponding spiral groove, the contact point of the corresponding secondary power cable within the spiral groove moves laterally away from the first draw cable pulley.

Example 23

The bow of any one of Examples 19 through 22 wherein one or more of pitch, pitch angle, or effective radius of the spiral grooves of the corresponding split-buss let-out pulleys differ between the split-buss let-out pulleys.

Example 24

The bow of any one of Examples 19 through 23 wherein one or more of pitch, pitch angle, or effective radius of the corresponding spiral groove of at least one of the split-buss let-out pulleys vary along the corresponding spiral groove.

Example 25

The bow of any one of Examples 19 through 24 wherein (i) the pair of secondary power cables comprises a pair of bifurcated end segments of the split-buss end of the first power cable, and (ii) each one of the bifurcated end segments is attached to a corresponding one of the split-buss let-out pulleys.

Example 26

The bow of any one of Examples 19 through 24 wherein (i) a first one of the secondary power cables comprises an end segment of the split-buss end of the first power cable that is attached to a first one of the split-buss let-out pulleys, and (ii) a second one of the secondary power cables comprises an additional, discrete cable segment that is attached at a first end thereof to a second one of the split-buss let-out pulleys and attached at a second end thereof to the first power cable at a point displaced from the split-buss end thereof.

Example 27

The bow of any one of Examples 19 through 24 wherein (i) the split-buss end of the power cable includes a yoke or coupling member, (ii) the first power cable is attached to the yoke or coupling member, (iii) a first one of the secondary power cables comprises a first additional, discrete cable segment attached at a first end thereof to a first one of the split-buss let-out pulleys and at a second end thereof to the yoke or coupling member, and (iv) a second one of the secondary power cables comprises a second additional, discrete cable segment attached at a first end thereof to a second one of the split-buss let-out pulleys and at a second end thereof to the yoke or coupling member.

Example 28

The bow of any one of Examples 19 through 24 wherein (i) the split-buss end of the power cable includes a yoke or coupling member, (ii) the first power cable is attached to the yoke or coupling member, and (iii) the pair of secondary power cables comprises a single, discrete, additional cable segment attached at one end thereof to a first one of the split-buss let-out pulleys, attached at a second end thereof to a second one of the split-buss let-out pulleys, and looped around the yoke or coupling member.

Example 29

The bow of Example 28 wherein the yoke or coupling member includes a bearing portion structurally arranged so as to permit movement of the yoke or coupling member along the additional cable segment, thereby permitting alteration of relative lengths of the first and second secondary power cables as the bow is drawn, the first and second secondary power cables are let out from the corresponding split-buss let-out pulleys, and the yoke or coupling member moves along the additional cable segment.

Example 30

The bow of any one of Examples 19 through 29 wherein the first-power-cable take-up mechanism and the split-buss let-out pulleys are structurally arranged so as to avoid 100% let-off of draw force of the bow or so as to prevent cocking of the bow.

Example 31

The bow of any one of Examples 19 through 30 wherein the first-power-cable take-up mechanism and the split-buss let-out pulleys are structurally arranged so that a ratio between a take-up lever arm of the first-power-cable take-up mechanism and a let-out lever arm of the split-buss let-out pulleys remains greater than 1:1 during drawing of the bow.

Example 32

The bow of any one of Examples 19 through 31 wherein the first-power-cable take-up mechanism comprises a first-power-cable pulley structurally arranged so as to take up, into a corresponding circumferential groove thereof, the take-up end of the first power cable, when the bow is drawn and the first-power-cable pulley rotates with the second draw cable pulley about the second pulley assembly axis.

Example 33

The bow of any one of Examples 19 through 32 further comprising a second power cable, wherein: (h) the second pulley assembly further comprises a corresponding pair of split-buss let-out pulleys positioned on opposite sides of the second draw cable pulley, and the second draw cable pulley is non-rotatably mounted on the second axle; (i) each split-buss let-out pulley of the second pulley assembly is (i) non-rotatably mounted on the second axle, and (ii) structurally arranged so as to let out, from a corresponding spiral groove thereof, a corresponding one of two secondary power cables of a split-buss end of the second power cable, when the bow is drawn and the corresponding pair of split-buss let-out pulleys rotates with the second axle about the second pulley assembly axis; (j) each spiral groove is structurally arranged on the corresponding split-buss let-out pulley of the second pulley assembly so that, when the bow is drawn, as the second pulley assembly rotates and the corresponding secondary power cable of the split buss-end of the second power cable is let-out from the spiral groove, a contact point of the corresponding secondary power cable within the spiral groove moves laterally away from the second draw cable pulley; (k) the first pulley assembly further comprises a take-up mechanism for the second power cable, wherein (i) the second-power-cable take-up mechanism is non-rotatably mounted on the first axle or on the first draw cable pulley, and (ii) the second-power-cable take-up mechanism is structurally arranged so as to take-up a take-up end of the second power cable, when the bow is drawn and the second-power-cable take-up mechanism rotates with the first draw cable pulley about the first pulley assembly axis; and (l) the bow is thereby arranged as a binary cam compound bow.

Example 34

The bow of Example 33 wherein (i) the first-power-cable take-up mechanism comprises a first power cable pulley structurally arranged so as to take up, into a corresponding circumferential groove thereof, the take-up end of the first power cable, when the bow is drawn and the first power cable pulley rotates with the second draw cable pulley about the second pulley assembly axis, and (ii) the second-power-cable take-up mechanism comprises a second power cable pulley structurally arranged so as to take up, into a corresponding circumferential groove thereof, the take-up end of the second power cable, when the bow is drawn and the second power cable pulley rotates with the first draw cable pulley about the first pulley assembly axis.

Example 35

The bow of any one of Examples 33 or 34 wherein the first and second pulley assemblies are substantially identical to, or substantial mirror images of, each other.

Example 36

The bow of any one of Examples 19 through 32 wherein: (h) the second pulley assembly further comprises a draw cable let-out mechanism, wherein (i) the draw cable let-out mechanism is non-rotatably mounted on the second axle or on the second draw cable pulley, (ii) the second draw cable pulley is structurally arranged so as to let out a first end of the draw cable, when the bow is drawn and the second draw cable pulley rotates about the second pulley assembly axis, and (iii) the draw cable let-out mechanism is structurally arranged so as to let-out a second end of the draw cable, when the bow is drawn and the second draw cable pulley rotates about the second pulley assembly axis; (i) the first draw cable pulley comprises an idler wheel, and the draw cable passes around the idler wheel; and (j) the bow is thereby arranged as a solo cam compound bow.

Example 37

The bow of any one of Examples 19 through 32 further comprising a coupling cable, wherein: (h) the second pulley assembly further comprises a coupling cable let-out mechanism, wherein the coupling cable let-out mechanism is (i) non-rotatably mounted on the second axle or on the second draw cable pulley and (ii) structurally arranged so as to let-out a first end of the coupling cable, when the bow is drawn and the second draw cable pulley rotates about the second pulley assembly axis; (i) the first pulley assembly further comprises a coupling cable take-up mechanism, wherein the coupling cable take-up mechanism is (i) non-rotatably mounted on the first axle or on the first draw cable pulley and (ii) structurally arranged so as to take up a second end of the coupling cable, when the bow is drawn and the power cable pulley rotates with the axle about the first pulley assembly axis; and (j) the bow is thereby arranged as a hybrid cam compound bow.

Example 38

The bow of any one of Examples 19 through 37 wherein both of the split-buss let-out pulleys are substantially cylindrical and mounted concentrically with respect to the axle.

Example 39

The bow of any one of Examples 19 through 37 wherein both of the split-buss let-out pulleys are non-circular, frusto-conical, or mounted eccentrically with respect to the axle.

Example 40

The bow of any one of Examples 19 through 39 wherein (i) the first draw cable pulley and the first axle are indexed to non-rotatably engage one another at a selected relative angular position, or (ii) each split-buss cable let-out pulley and the first axle are indexed to non-rotatably engage one another at a selected relative angular position.

Example 41

The bow of any one of Examples 19 through 40 wherein (i) the first draw cable pulley and the first axle are indexed to non-rotatably engage one another at a single, substantially fixed relative angular position, or (ii) each split-buss cable let-out pulley and the first axle are indexed to non-rotatably engage one another at a single, substantially fixed relative angular position.

Example 42

The bow of any one of Examples 19 through 40 wherein (i) the first draw cable pulley and the first axle are indexed to non-rotatably engage one another at any selected one of multiple relative angular positions, or (ii) each split-buss cable let-out pulley and the first axle are indexed to non-rotatably engage one another at any selected one of multiple relative angular positions.

Example 43

A compound archery bow comprising: (a) a substantially rigid riser; (b) a first resilient bow limb extending from a first end portion of the riser and a second resilient bow limb extending from a second end portion of the riser; (c) a draw cable and a first power cable; (d) a first pulley assembly comprising a first axle, a first draw cable pulley, and a split-buss let-out pulleys positioned on one side of the first draw cable pulley, wherein (i) the first axle is rotatably mounted on the first limb so as to define and rotate about a first pulley assembly transverse rotation axis, (ii) the first draw cable pulley is non-rotatably mounted on the first axle, and (iii) the first draw cable pulley is structurally arranged so as to let out the draw cable, from a circumferential draw cable groove of the first draw cable pulley, when the bow is drawn and the first draw cable pulley rotates with the first axle about the first pulley assembly axis; and (e) a second pulley assembly comprising a second axle, a second draw cable pulley, and a take-up mechanism for the first power cable, wherein (i) the second axle is mounted on the second limb so as to define a second pulley assembly transverse rotation axis, (ii) the second draw cable pulley is mounted on the second axle so as to rotate about the second pulley assembly axis, (iii) the second draw cable pulley is structurally arranged so as to let out the draw cable, from a circumferential draw cable groove of the second draw cable pulley, when the bow is drawn and the second draw cable pulley rotates about the second pulley assembly axis, (iv) the first-power-cable take-up mechanism is non-rotatably mounted on the second axle or on the second draw cable pulley, and (v) the first-power-cable take-up mechanism is structurally arranged so as to take-up a take-up end of the first power cable, when the bow is drawn and the first-power-cable take-up mechanism rotates with the second draw cable pulley about the second pulley assembly axis, wherein: (f) the split-buss let-out pulley of the first pulley assembly is (i) non-rotatably mounted on the first axle, and (ii) structurally arranged so as to let out a first secondary power cable of a split-buss end of the first power cable, when the bow is drawn and the split-buss let-out pulley rotates with the first axle about the first pulley assembly axis; (g) the split-buss let-out pulley is structurally arranged to have wound therearound the first secondary power cable in a spiral arrangement so that, when the bow is drawn, as the first pulley assembly rotates and the first secondary power cable is let-out from the split-buss let-out pulley, a contact point of the first secondary power cable on the split-buss let-out pulley moves laterally away from the first draw cable pulley; (h) the split-buss end of the power cable includes a yoke or coupling member and the first power cable is attached to the yoke or coupling member; (i) the split-buss end of the power cable includes a single, discrete, additional cable segment that is (i) looped around the yoke or coupling member, (ii) attached at a first end thereof to the split-buss let-out pulley to form the first secondary power cable, and (iii) attached at a second end thereof to the first axle or first bow limb to form a second secondary power cable; and (j) the yoke or coupling member includes a bearing structurally arranged so as to permit movement of the yoke or coupling member along the additional cable segment, thereby permitting alteration of relative lengths of the first and second secondary power cables as the bow is drawn, the first secondary power cable is let out from the split-buss let-out pulley, and the yoke or coupling member moves along the additional cable segment.

Example 44

The bow of Example 43 wherein the split-buss let-out pulley includes a circumferential spiral groove structurally arranged so as to receive therein the first secondary power cable wound therearound in the spiral arrangement, and the spiral groove is structurally arranged on the split-buss let-out pulley so that, when the bow is drawn, as the first pulley assembly rotates and the first secondary power cable is let-out from the spiral groove, the contact point of the first secondary power cable within the spiral groove moves laterally away from the first draw cable pulley.

Example 45

The bow of any one of Examples 43 or 44 wherein (i) the first pulley assembly is arranged analogously to any one of Examples 1 through 18, or (ii) the first pulley assembly or the bow is arranged analogously to any one of Examples 19 through 42.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore the present disclosure shall be construed as implicitly disclosing any embodiment having any suitable set of one or more features—which features are shown, described, or claimed in the present application— including those sets that may not be explicitly disclosed herein. A "suitable" set of features includes only features that are neither incompatible nor mutually exclusive with respect to any other feature of the set. Accordingly, the appended claims are hereby incorporated into the Detailed Description, with each claim standing on its own as a separate disclosed embodiment. In addition, only for purposes of disclosure by said incorporation of the claims into the Detailed Description, each of the appended dependent claims shall be interpreted as if written in multiple dependent form and dependent upon all preceding claims with which it is not inconsistent. It should be further noted that the scope of the appended claims can, but does not necessarily, encompass the whole of the subject matter disclosed in the present application.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

For purposes of the present disclosure and appended claims, any labelling of elements, steps, limitations, or other portions of an embodiment, example, or claim (e.g., first, second, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A pulley assembly for a compound archery bow, the pulley assembly comprising an axle, a draw cable pulley, and a pair of split-buss let-out pulleys positioned on opposite sides of the draw cable pulley, wherein:
   (a) the axle is structurally arranged so as to (i) define a first pulley assembly transverse rotation axis and (ii) be rotatably mounted on a first limb of a compound archery bow to rotate about the first pulley assembly axis;
   (b) the draw cable pulley is (i) non-rotatably mounted on the axle and (ii) structurally arranged so as to let out, from a circumferential draw cable groove thereof, a draw cable of the archery bow, when the bow is drawn and the draw cable pulley rotates with the axle about the first pulley assembly axis;
   (c) each split-buss let-out pulley is (i) non-rotatably mounted on the axle, and (ii) structurally arranged so as to let out a corresponding one of two secondary power cables of a split-buss end of a first power cable of the archery bow, when the bow is drawn and the pair of split-buss let-out pulleys rotates with the axle about the first pulley assembly axis; and
   (d) each split-buss let-out pulley is structurally arranged to have wound therearound the corresponding secondary power cable in a spiral arrangement so that, when the bow is drawn, as the pulley assembly rotates and the corresponding secondary power cable is let-out from the split-buss let-out pulley, a contact point of the corresponding secondary power cable on the split-buss let-out pulley moves laterally away from the draw cable pulley.

2. The pulley assembly of claim 1 wherein each split-buss let-out pulley includes a corresponding circumferential spiral groove structurally arranged so as to receive therein the corresponding secondary power cable wound therearound in the spiral arrangement, and the corresponding spiral groove is structurally arranged on the split-buss let-out pulley so that, when the bow is drawn, as the first pulley assembly rotates and the corresponding secondary power cable is let-out from the corresponding spiral groove, the contact point of the corresponding secondary power cable within the spiral groove moves laterally away from the first draw cable pulley.

3. The pulley assembly of claim 2 wherein one or more of pitch, pitch angle, or effective radius of the spiral grooves of the corresponding split-buss let-out pulleys differ between the split-buss let-out pulleys.

4. The pulley assembly of claim 2 wherein one or more of pitch, pitch angle, or effective radius of the corresponding spiral groove of at least one of the split-buss let-out pulleys vary along the corresponding spiral groove.

5. The pulley assembly of claim 1 further comprising a power cable take-up mechanism, wherein the power cable take-up mechanism is (i) non-rotatably mounted on the axle or on the draw cable pulley and (ii) structurally arranged so as to take up a take-up end of a second power cable of a binary cam archery bow, when the bow is drawn and the power cable pulley rotates with the axle about the first pulley assembly axis.

6. The pulley assembly of claim 5 wherein the power cable take-up mechanism comprises a power cable pulley structurally arranged so as to take up, into a corresponding circumferential groove thereof, the take-up end of the second power cable, when the bow is drawn and the power cable pulley rotates with the axle about the first pulley assembly axis.

7. The pulley assembly of claim 5 further comprising a second pulley assembly, wherein the pulley assembly and the second pulley assembly are substantially identical to one another, or are substantial mirror images of one another.

8. The pulley assembly of claim 1 wherein the draw cable pulley comprises an idler wheel of a solo cam compound bow.

9. The pulley assembly of claim 1 further comprising a coupling cable take-up mechanism, wherein the coupling cable take-up mechanism is (i) non-rotatably mounted on the axle or on the draw cable pulley and (ii) structurally arranged so as to take up a coupling cable of a hybrid cam archery bow, when the bow is drawn and the draw cable pulley rotates with the axle about the first pulley assembly axis.

10. The pulley assembly of claim 1 wherein both of the split-buss let-out pulleys are substantially cylindrical and mounted concentrically with respect to the axle.

11. The pulley assembly of claim 1 wherein both of the split-buss let-out pulleys are non-circular, frusto-conical, or mounted eccentrically with respect to the axle.

12. A compound archery bow comprising:
    (a) a substantially rigid riser;
    (b) a first resilient bow limb extending from a first end portion of the riser and a second resilient bow limb extending from a second end portion of the riser;
    (c) a draw cable and a first power cable;
    (d) a first pulley assembly comprising a first axle, a first draw cable pulley, and a pair of split-buss let-out pulleys positioned on opposite sides of the first draw cable pulley, wherein (i) the first axle is rotatably mounted on the first limb so as to define and rotate about a first pulley assembly transverse rotation axis, (ii) the first draw cable pulley is non-rotatably mounted on the first axle, and (iii) the first draw cable pulley is structurally arranged so as to let out the draw cable, from a circumferential draw cable groove of the first draw cable pulley, when the bow is drawn and the first draw cable pulley rotates with the first axle about the first pulley assembly axis; and
    (e) a second pulley assembly comprising a second axle, a second draw cable pulley, and a take-up mechanism for the first power cable, wherein (i) the second axle is mounted on the second limb so as to define a second pulley assembly transverse rotation axis, (ii) the second draw cable pulley is mounted on the second axle so as to rotate about the second pulley assembly axis, (iii) the second draw cable pulley is structurally arranged so as to let out the draw cable, from a circumferential draw cable groove of the second draw cable pulley, when the bow is drawn and the second draw cable pulley rotates about the second pulley assembly axis, (iv) the firstpower-cable take-up mechanism is non-rotatably mounted on the second axle or on the second draw cable pulley, and (v) the first-power-cable take-up mechanism is structurally arranged so as to take-up a take-up end of the first power cable, when the bow is drawn and the first-power-cable take-up mechanism rotates with the second draw cable pulley about the second pulley assembly axis, wherein:
- (f) each split-buss let-out pulley of the first pulley assembly is (i) non-rotatably mounted on the first axle, and (ii) structurally arranged so as to let out a corresponding one of two secondary power cables of a split-buss end of the first power cable, when the bow is drawn and the pair of split-buss let-out pulleys rotates with the first axle about the first pulley assembly axis; and
- (g) each split-buss let-out pulley is structurally arranged to have wound therearound the corresponding secondary power cable of the first power cable in a spiral arrangement so that, when the bow is drawn, as the first pulley assembly rotates and the corresponding secondary power cable is let-out from the split-buss let-out pulley, a contact point of the corresponding secondary power cable on the split-buss let-out pulley moves laterally away from the first draw cable pulley.

13. The bow of claim 12 wherein one or more of pitch, pitch angle, effective radius, or secondary cable angle of the spiral arrangements of the secondary power cables wound around the corresponding split-buss let-out pulleys differ between the split-buss let-out pulleys.

14. The bow of claim 12 wherein one or both of the first pulley assembly or the split-buss end of the first power cable are structurally arranged so that one or more of pitch, pitch angle, effective radius, or secondary cable angle of the spiral arrangement of at least one of the secondary power cables wound around the corresponding split-buss let-out pulley vary during drawing of the bow.

15. The bow of claim 12 wherein each split-buss let-out pulley includes a corresponding circumferential spiral groove structurally arranged so as to receive therein the corresponding secondary power cable wound therearound in the spiral arrangement, and the corresponding spiral groove is structurally arranged on the split-buss let-out pulley so that, when the bow is drawn, as the first pulley assembly rotates and the corresponding secondary power cable is let-out from the corresponding spiral groove, the contact point of the corresponding secondary power cable within the spiral groove moves laterally away from the first draw cable pulley.

16. The bow of claim 15 wherein one or more of pitch, pitch angle, or effective radius of the spiral grooves of the corresponding split-buss let-out pulleys differ between the split-buss let-out pulleys.

17. The bow of claim 15 wherein one or more of pitch, pitch angle, or effective radius of the corresponding spiral groove of at least one of the split-buss let-out pulleys vary along the corresponding spiral groove.

18. The bow of claim 12 wherein the first-power-cable take-up mechanism and the split-buss let-out pulleys are structurally arranged so as to avoid 100% let-off of draw force of the bow or so as to prevent cocking of the bow.

19. The bow of claim 12 wherein the first-power-cable take-up mechanism and the split-buss let-out pulleys are structurally arranged so that a ratio between a take-up lever arm of the first-power-cable take-up mechanism and a let-out lever arm of the split-buss let-out pulleys remains greater than 1:1 during drawing of the bow.

20. The bow of claim 12 wherein the first-power-cable take-up mechanism comprises a first-power-cable pulley structurally arranged so as to take up, into a corresponding circumferential groove thereof, the take-up end of the first power cable, when the bow is drawn and the first-power-cable pulley rotates with the second draw cable pulley about the second pulley assembly axis.

21. The bow of claim 12 further comprising a second power cable, wherein:
- (h) the second pulley assembly further comprises a corresponding pair of split-buss let-out pulleys positioned on opposite sides of the second draw cable pulley, and the second draw cable pulley is non-rotatably mounted on the second axle;
- (i) each split-buss let-out pulley of the second pulley assembly is (i) non-rotatably mounted on the second axle, and (ii) structurally arranged so as to let out a corresponding one of two secondary power cables of a split-buss end of the second power cable, when the bow is drawn and the corresponding pair of split-buss let-out pulleys rotates with the second axle about the second pulley assembly axis;
- (j) each split-buss let-out pulley of the second pulley assembly is structurally arranged to have wound therearound the corresponding secondary power cable of the second power cable in a spiral arrangement so that, when the bow is drawn, as the second pulley assembly rotates and the corresponding secondary power cable is let-out from the split-buss let-out pulley, a contact point of the corresponding secondary power cable on the split-buss let-out pulley moves laterally away from the second draw cable pulley;
- (k) the first pulley assembly further comprises a take-up mechanism for the second power cable, wherein (i) the second-power-cable take-up mechanism is non-rotatably mounted on the first axle or on the first draw cable pulley, and (ii) the second-power-cable take-up mechanism is structurally arranged so as to take-up a take-up end of the second power cable, when the bow is drawn and the second-power-cable take-up mechanism rotates with the first draw cable pulley about the first pulley assembly axis; and
- (l) the bow is thereby arranged as a binary cam compound bow.

22. The bow of claim 21 wherein the first and second pulley assemblies are substantially identical to, or substantial mirror images of, each other.

23. The bow of claim 12 wherein:
- (h) the second pulley assembly further comprises a draw cable let-out mechanism, wherein (i) the draw cable let-out mechanism is non-rotatably mounted on the second axle or on the second draw cable pulley, (ii) the second draw cable pulley is structurally arranged so as to let out a first end of the draw cable, when the bow is drawn and the second draw cable pulley rotates about the second pulley assembly axis, and (iii) the draw cable let-out mechanism is structurally arranged so as to let-out a second end of the draw cable, when the bow is drawn and the second draw cable pulley rotates about the second pulley assembly axis;
- (i) the first draw cable pulley comprises an idler wheel, and the draw cable passes around the idler wheel; and
- (j) the bow is thereby arranged as a solo cam compound bow.

24. The bow of claim 12 further comprising a coupling cable, wherein:
- (h) the second pulley assembly further comprises a coupling cable let-out mechanism, wherein the coupling cable let-out mechanism is (i) non-rotatably mounted on the second axle or on the second draw cable pulley and (ii) structurally arranged so as to let-out a first end of the coupling cable, when the bow is drawn and the second draw cable pulley rotates about the second pulley assembly axis;
- (i) the first pulley assembly further comprises a coupling cable take-up mechanism, wherein the coupling cable take-up mechanism is (i) non-rotatably mounted on the first axle or on the first draw cable pulley and (ii) structurally arranged so as to take up a second end of the coupling cable, when the bow is drawn and the power cable pulley rotates with the axle about the first pulley assembly axis; and
- (j) the bow is thereby arranged as a hybrid cam compound bow.

25. A compound archery bow comprising:
- (a) a substantially rigid riser;
- (b) a first resilient bow limb extending from a first end portion of the riser and a second resilient bow limb extending from a second end portion of the riser;
- (c) a draw cable and a first power cable;
- (d) a first pulley assembly comprising a first axle, a first draw cable pulley, and a split-buss let-out pulleys positioned on one side of the first draw cable pulley, wherein (i) the first axle is rotatably mounted on the first limb so as to define and rotate about a first pulley assembly transverse rotation axis, (ii) the first draw cable pulley is non-rotatably mounted on the first axle, and (iii) the first draw cable pulley is structurally arranged so as to let out the draw cable, from a circumferential draw cable groove of the first draw cable pulley, when the bow is drawn and the first draw cable pulley rotates with the first axle about the first pulley assembly axis; and
- (e) a second pulley assembly comprising a second axle, a second draw cable pulley, and a take-up mechanism for the first power cable, wherein (i) the second axle is mounted on the second limb so as to define a second pulley assembly transverse rotation axis, (ii) the second draw cable pulley is mounted on the second axle so as to rotate about the second pulley assembly axis, (iii) the second draw cable pulley is structurally arranged so as to let out the draw cable, from a circumferential draw cable groove of the second draw cable pulley, when the bow is drawn and the second draw cable pulley rotates about the second pulley assembly axis, (iv) the first-power-cable take-up mechanism is non-rotatably mounted on the second axle or on the second draw cable pulley, and (v) the first-power-cable take-up mechanism is structurally arranged so as to take-up a take-up end of the first power cable, when the bow is drawn and the first-power-cable take-up mechanism rotates with the second draw cable pulley about the second pulley assembly axis, wherein:
- (f) the split-buss let-out pulley of the first pulley assembly is (i) non-rotatably mounted on the first axle, and (ii) structurally arranged so as to let out a first secondary power cable of a split-buss end of the first power cable, when the bow is drawn and the split-buss let-out pulley rotates with the first axle about the first pulley assembly axis;
- (g) the split-buss let-out pulley is structurally arranged to have wound therearound the first secondary power cable in a spiral arrangement so that, when the bow is drawn, as the first pulley assembly rotates and the first secondary power cable is let-out from the split-buss let-out pulley, a contact point of the first secondary power cable on the split-buss let-out pulley moves laterally away from the first draw cable pulley;
- (h) the split-buss end of the power cable includes a yoke or coupling member and the first power cable is attached to the yoke or coupling member;
- (i) the split-buss end of the power cable includes a single, discrete, additional cable segment that is (i) looped around the yoke or coupling member, (ii) attached at a first end thereof to the split-buss let-out pulley to form the first secondary power cable, and (iii) attached at a second end thereof to the first axle or first bow limb to form a second secondary power cable; and
- (j) the yoke or coupling member includes a bearing structurally arranged so as to permit movement of the yoke or coupling member along the additional cable segment, thereby permitting alteration of relative lengths of the first and second secondary power cables as the bow is drawn, the first secondary power cable is let out from the split-buss let-out pulley, and the yoke or coupling member moves along the additional cable segment.

* * * * *